(12) United States Patent  
Harper et al.

(10) Patent No.: US 11,762,792 B1
(45) Date of Patent: *Sep. 19, 2023

(54) DATA TRANSMISSION SYSTEM

(71) Applicant: Siren Marine, Inc., Newport, RI (US)

(72) Inventors: Daniel A. Harper, Newport, RI (US); Dave Morschhauser, Newport, RI (US); Phillip King Gaynor, Newport, RI (US)

(73) Assignee: Siren Marine, Inc., Newport, RI (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/126,007

(22) Filed: Mar. 24, 2023

Related U.S. Application Data

(63) Continuation of application No. 16/945,693, filed on Jul. 31, 2020, now Pat. No. 11,615,039.

(51) Int. Cl.
| | |
|---|---|
| *G06F 13/20* | (2006.01) |
| *B63B 79/10* | (2020.01) |
| *H04W 4/38* | (2018.01) |
| *H04W 4/44* | (2018.01) |
| *H04W 4/70* | (2018.01) |
| *H04L 12/40* | (2006.01) |

(52) U.S. Cl.
CPC ............. *G06F 13/20* (2013.01); *B63B 79/10* (2020.01); *H04W 4/38* (2018.02); *H04W 4/44* (2018.02); *H04W 4/70* (2018.02); *B63B 2203/00* (2013.01); *H04L 2012/40215* (2013.01); *H04L 2012/40286* (2013.01)

(58) Field of Classification Search
CPC ................................ H04L 12/28; H04W 4/02
See application file for complete search history.

(56) References Cited

U.S. PATENT DOCUMENTS

| | | |
|---|---|---|
| 6,249,241 B1 | 6/2001 | Jordan et al. |
| 8,531,294 B2 | 9/2013 | Slavin et al. |
| 8,565,100 B2 | 10/2013 | Jokimies et al. |
| 8,676,402 B1 | 3/2014 | Foster |
| 8,994,562 B1 | 3/2015 | Daniel et al. |
| 9,123,229 B2 | 9/2015 | Slavin et al. |
| 9,135,731 B2 | 9/2015 | Lauenstein et al. |
| 9,728,013 B2 | 8/2017 | Gaynor |
| 9,986,197 B2 | 5/2018 | Gaynor |
| 10,650,621 B1 | 5/2020 | King et al. |
| 10,701,532 B2 | 6/2020 | Jung et al. |
| 11,232,655 B2 | 1/2022 | Bhattacharyya et al. |

(Continued)

FOREIGN PATENT DOCUMENTS

| | | |
|---|---|---|
| WO | 2016160853 A1 | 10/2016 |
| WO | 2018112661 A1 | 6/2018 |

OTHER PUBLICATIONS

Foreign references and the NPLs are not submitted herewith as they can be retrieved in the Parent U.S. Appl. No. 16/945,693, filed Jul. 31, 2020.

(Continued)

*Primary Examiner* — Getente A Yimer
(74) *Attorney, Agent, or Firm* — Global IP Counselors LLP

(57) ABSTRACT

A marine-type communication device that reads data from a data bus, dynamically creates new data channels for a plurality of operational systems and performs a volatility assessment to determine when to save the data for transmission to a cloud network and when to transmit the data to the cloud network.

26 Claims, 14 Drawing Sheets

(56) References Cited

U.S. PATENT DOCUMENTS

| | | | |
|---|---|---|---|
| 11,249,176 | B2 | 2/2022 | Hooper |
| 11,432,126 | B2 | 8/2022 | Morschhäuser et al. |
| 11,681,040 | B2 * | 6/2023 | Harper .................. G01S 19/01 |
| | | | 701/21 |
| 2001/0039910 | A1 | 11/2001 | Koda et al. |
| 2002/0158776 | A1 | 10/2002 | Lash et al. |
| 2004/0059477 | A1 | 3/2004 | Kish et al. |
| 2004/0075539 | A1 | 4/2004 | Savoie et al. |
| 2004/0217900 | A1 | 11/2004 | Martin et al. |
| 2006/0176193 | A1 | 8/2006 | Wraight |
| 2007/0115859 | A1 * | 5/2007 | Meyers .................. G06Q 50/28 |
| | | | 370/254 |
| 2008/0007431 | A1 | 1/2008 | Jacques |
| 2008/0147257 | A1 | 6/2008 | Kuhlgatz et al. |
| 2008/0246627 | A1 | 10/2008 | Guazzelli |
| 2009/0033552 | A1 * | 2/2009 | Kirmuss .............. H04B 1/3805 |
| | | | 701/467 |
| 2009/0187297 | A1 | 7/2009 | Kish et al. |
| 2010/0289644 | A1 | 11/2010 | Slavin et al. |
| 2013/0163511 | A1 | 6/2013 | Waldner et al. |
| 2013/0185147 | A1 * | 7/2013 | Letca ................. G06Q 30/0611 |
| | | | 705/14.47 |
| 2014/0071167 | A1 | 3/2014 | Lauenstein et al. |
| 2014/0266793 | A1 | 9/2014 | Velado et al. |
| 2015/0089434 | A1 | 3/2015 | Akuzawa |
| 2015/0369787 | A1 | 12/2015 | Stuer-Lauridsen |
| 2016/0011863 | A1 | 1/2016 | Isaacson et al. |
| 2016/0012401 | A1 | 1/2016 | Coloney et al. |
| 2016/0012650 | A1 | 1/2016 | Coloney et al. |
| 2016/0013979 | A1 | 1/2016 | Coloney et al. |
| 2016/0013998 | A1 | 1/2016 | Coloney et al. |
| 2016/0180721 | A1 | 6/2016 | Otulic |
| 2016/0225195 | A1 | 8/2016 | Gaynor |
| 2016/0252906 | A1 | 9/2016 | Langford-Wood |
| 2016/0253150 | A1 | 9/2016 | Williams et al. |
| 2016/0260059 | A1 | 9/2016 | Benjamin et al. |
| 2017/0019268 | A1 | 1/2017 | Lieberman et al. |
| 2017/0126578 | A1 | 5/2017 | Amulothu et al. |
| 2017/0238129 | A1 | 8/2017 | Maier et al. |
| 2017/0251096 | A1 | 8/2017 | Koepke |
| 2017/0323154 | A1 | 11/2017 | Kollmann et al. |
| 2017/0356996 | A1 | 12/2017 | Lee |
| 2018/0004213 | A1 | 1/2018 | Absmeier et al. |
| 2018/0023954 | A1 | 1/2018 | Rivers |
| 2018/0063467 | A1 | 3/2018 | Gaynor |
| 2018/0124557 | A1 * | 5/2018 | Bartley .................. B63B 49/00 |
| 2018/0158340 | A1 | 6/2018 | Moura |
| 2018/0220279 | A1 | 8/2018 | Jung et al. |
| 2018/0286251 | A1 | 10/2018 | Fujima et al. |
| 2019/0019352 | A1 | 1/2019 | Harper |
| 2019/0116632 | A1 | 4/2019 | Virkkala et al. |
| 2019/0141496 | A1 | 5/2019 | Laster et al. |
| 2019/0147669 | A1 | 5/2019 | Park et al. |
| 2019/0364399 | A1 | 11/2019 | Furuichi |
| 2020/0026417 | A1 | 1/2020 | Corbett et al. |
| 2020/0064466 | A1 | 2/2020 | Harper et al. |
| 2020/0252775 | A1 | 8/2020 | Morschhauser et al. |
| 2020/0273268 | A1 | 8/2020 | Bhattacharyya et al. |
| 2020/0278433 | A1 | 9/2020 | Vanhakartano et al. |
| 2020/0363209 | A1 | 11/2020 | Isojärvi |
| 2021/0129951 | A1 | 5/2021 | Kvernvik et al. |
| 2022/0035755 | A1 | 2/2022 | Harper et al. |

OTHER PUBLICATIONS

European Search Report issued in EP Application No. 18832960.1, dated Jun. 8, 2020.
Final Office Action for U.S. Appl. No. 16/034,068 dated Dec. 22, 2020.
International Preliminary Report of Patentability and Written Opinion issued in connection with corresponding International Application No. PCT/US2018/041881, dated Jan. 14, 2020.
International Search Report & Written Opinion issued in International Application No. PCT/US2020/0044638, dated Oct. 19, 2020.
International Search Report & Written Opinion received in Application No. PCT/US2018/041881 dated Nov. 29, 2018.
Non Final Office Action for U.S. Appl. No. 16/945,693, dated Mar. 16, 2022.
Non-Final Office Action for U.S. Appl. No. 16/034,068 dated May 26, 2020.
Non-Final Office Action for U.S. Appl. No. 16/034,068 dated Oct. 18, 2021.
Office Action for U.S. Appl. No. 16/547,058 dated Mar. 24, 2022.
PCT Notification Concerning Transmittal of International Preliminary Report on Patentability, PCTUS2020044638, dated Feb. 9, 2023, 11 pages.
Australian Examination Report, AU2018301822, dated Aug. 23, 2022, 3 pages.

* cited by examiner

COMMENT: ADDED PAYLOAD 73 TO COMMUNICATE SWITCHBACK UI SELECTIONS FROM SERVER TO MTC. UPDATE PAYLOAD 120 TO ALSO HANDLE PAYLOAD TRANSMISSION ACKNOWLEDGMENTS.

GENERAL FORMAT FOR REAL-TIME TRANSMISSIONS

MESSAGE TIMESTAMP

| CHANNEL NUMBER (2-BYTES) | PAYLOAD TYPE (1-BYTE) | TIMESTAMP DATE (DAYS) (2-BYTES) | TIMESTAMP TIME (SEC) (3-BYTES) | PAYLOAD (SIZE DETERMINED BY TYPE) |
|---|---|---|---|---|

GENERAL FORMAT FOR DIGEST TRANSMISSIONS
NOTE: DIGEST ARE ONE OF TWO FORMS, LINEAR OR CIRCULAR. BOTH DIGESTS CONSIST OF SAMPLES RECORDED ONE AFTER THE OTHER BEGINNING AT THE TIME THE DIGEST IS STARTED. AN EXTERNAL EVENT MAY CAUSE EITHER DIGEST TO BE TRANSMITTED AT ANY TIME PRIOR TO THE DIGEST BECOMING FULL. THE DIFFERENCE BETWEEN THE TWO DIGEST TYPES IS WHAT OCCURS WHEN THE DIGEST BECOMES FULL.
1) WHEN A LINEAR DIGEST FILLS UP, THE DIGEST IS TRANSMITTED AND A NEW DIGEST IS STARTED.
2) WHEN A CIRCULAR DIGEST FILLS UP, RECORDING CONTINUES WITH EACH SAMPLE OVERWRITING THE OLDEST SAMPLE AT THE TIME. CIRCULAR DIGESTS ARE ONLY TRANSMITTED BASED ON THE OCCURRENCE OF AN EXTERNAL EVENT.
3) WHEN A CIRCULAR DIGEST IS TRANSMITTED, THE SAMPLE ORDER IS NORMALIZED SO THAT THE OLDEST SAMPLE IS THE FIRST SAMPLE AFTER THE DIGEST SIZE VALUE. NOTE THAT THE MESSAGE DATESTAMP IS THE DATE OF THE NEWEST SAMPLE ()THE LAST SAMPLE IN THE SET), AND THAT SOME OF THE EARLIER SAMPLES MAY BE FROM THE PREVIOUS DAY.
SEE DIGEST DESCRIPTION FOR MORE INFORMATION.

| | MESSAGE TIMESTAMP | | | | FIRST DIGEST SAMPLE (SAMPLE[0]) | | SECOND DIGEST SAMPLE (SAMPLE[1]) | |
|---|---|---|---|---|---|---|---|---|
| CHANNEL NUMBER (2-BYTES) | PAYLOAD TYPE (1-BYTE) | TIMESTAMP DATE (DAYS) (2-BYTES) | DIGEST SIZE | 1ST ENTRY TIMESTAMP TIME (SEC) (3-BYTES) | 1ST ENTRY PAYLOAD (SIZE DETERMINED BY TYPE) | 2ND ENTRY TIMESTAMP TIME (SEC) (3-BYTES) | 2ND ENTRY PAYLOAD (SIZE DETERMINED BY TYPE) |

→DIGEST SIZE=NUMBER OF SAMPLES IN DIGEST

GENERAL NOTES
1) MULTIBYTE VALUES ARE LITTLE ENDIAN
2) MULTIBYTE STRINGS ARE LEFT MOST BYTE FIRST
3) FIXED LENGTH STRINGS MAY BE TRANSMITTED WITHOUT TERMINATING CHARACTER, UNUSED CHARACTERS ARE SET TO 0xff
4) MAXIMUM POSITIVE VALUE RESERVED TO FLAG 'DATA NOT AVAILABLE' (UNSIGNED 0xff..ff, SIGNED 0x7f..FF)
5) SINCE VERSION 0.4 REMOVED ADDITIONAL PADDING BETWEEN PAYLOAD TYPE AND TIMESTAMP DATE (ONE BYTE) AND BETWEEN TIMESTAMP DATE AND TIMESTAMP TIME (TWO BYTES) THAT APPEARED IN PRIOR VERSIONS
6) SIGNED VALUES ARE FORMATTED USING TWO'S COMPLIMENT, UNLESS OTHERWISE NOTED.
7) LABEL FIELDS IN CHANNEL IDENTIFY (PAYLOAD TYPE 1) ONLY SUPPORTS 'NO LABEL' AND 'ASCII'
8) TIMESTAMP (DATE AND TIME) ARE UTC

ENGINE DIGEST (CIRCULAR)

| CHANNEL NUMBER (2-BYTES) | TIMESTAMP DATE (DAYS) (2-BYTES) | DIGEST SIZE | 1ST ENTRY TIMESTAMP TIME (SEC) (3-BYTES) | ENGINE DISCRETE STATUS 1 (2-BYTES) | ENGINE DISCRETE STATUS 2 (2-BYTES) | RPM (2-BYTES) | OIL PRESSURE (PA) (2-BYTES) | OIL TEMP (0C) (2-BYTES) | ENGINE TEMP (0C) (2-BYTES) | FUEL RATE(0.1-M/HR) (2-BYTES) | ENGINE HOURS 9SEC) (4-BYTES) | 2ND ENTRY, ETC |
|---|---|---|---|---|---|---|---|---|---|---|---|---|
| | 15 | 0 TO 65,532 | 1 TO 255 | 0 TO 86, 401 | SEE ENGINE HEALTH STATUS ASSIGNMENTS | TAB FOUR BIT | 0 TO 16,303 | 0 TO 6,553,200 | 0 TO 6,553,2 | 0 TO 6,553,2 | ±3.2764 | 0 TO 4X10 (APPROX) | |
| RANGE: | | DAYS SINCE 1/1/70 | | 1 | | | 1 | 100 | 0.1 | 0.01 | 0.0001 | 0.0001 | |
| RESOLUTION: | | | | | | | | | | | | | |

ENGINE FUEL DIGEST

| CHANNEL NUMBER (2-BYTES) | TIMESTAMP DATE (DAYS) (2-BYTES) | DIGEST SIZE | 1ST ENTRY TIMESTAMP TIME (SEC) (3-BYTES) | FUEL CONSUMPTION (CHI) (2-BYTES) | AVE FUEL RATE (CHI/HR) (2-BYTES) | 2ND ENTRY, ETC. |
|---|---|---|---|---|---|---|
| | 16 | 0 TO 65,532 | 1 TO 255 | 0 TO 86, 401 | 0 TO 6.5536 | 0 TO 6.5536 | |
| RANGE: | | DAYS SINCE 1/1/70 | | 1 | 0.0001 | 0.0001 | |
| RESOLUTION: | | | | | | | |

NOTE: THERE IS NI INVALID DATA CODE FOR FUEL CONSUMPTION, IF THE MTC DOESN'T HAVE A VALID VALUE, IT WILL SEND 0.

WIND DATA DIGEST

| CHANNEL NUMBER (2-BYTES) | TIMESTAMP DATE (DAYS) (2-BYTES) | DIGEST SIZE | 1ST ENTRY TIMESTAMP TIME (SEC) (3-BYTES) | WIND SPEED (M/S) (2-BYTES) | WIND GUST (M/S) (2-BYTES) | WIND DIRECTION (RAD) (2-BYTES) | DIRECTION MODE | 2ND ENTRY, ETC. |
|---|---|---|---|---|---|---|---|---|
| | 35 | 0 TO 65,532 | 1 TO 255 | 0 TO 86, 401 | 0 TO 6.5532 | 0 TO 6.5536 | 0.702 π | | |
| RANGE: | | DAYS SINCE 1/1/70 | | 1 | 0.01 | 0.01 | 0.0001 | | |
| RESOLUTION: | | | | | | | | | |

0x00 = GROUND REF; TRUE
0x01 = GROUND REF; MAGNETIC
0X02 = VESSEL REF; APPARENT
0xFE = ERROR
0xFF = INVALID

CONTINUED ON NEXT SHEET

FIG. 7A

CONTINUED FROM THE PREVIOUS SHEET

ENVIRONMENTAL DATA DIGEST

| CHANNEL NUMBER (2-BYTES) | 45 | TIMESTAMP DATE (DAYS) (2-BYTES) | DIGEST SIZE | 1ST ENTRY TIMESTAMP TIME (SEC) (3-BYTES) | HUMIDITY (%) (2-BYTES) | ATMOSPHERIC PRESSURE (PA) (2-BYTES) | TEMPERATURE (o|C) (2-BYTES) | 2ND ENTRY, ETC. |
|---|---|---|---|---|---|---|---|---|
| RANGE: RESOLUTION: | | 0 TO 65,532 DAYS SINCE 1/1/70 | 1 TO 255 | 0 TO 86,401 1 | -131.072 TO 131.056 0.004 | -3,276,800 TO 3,276,700 100 | 0 TO 655.32 0.01 | |

TANK DATA DIGEST

| CHANNEL NUMBER (2-BYTES) | 65 | TIMESTAMP DATE (DAYS) (2-BYTES) | DIGEST SIZE | 1ST ENTRY TIMESTAMP TIME (SEC) (3-BYTES) | FLUID LEVEL (%) (2-BYTES) | 2ND ENTRY, ETC. |
|---|---|---|---|---|---|---|
| RANGE: RESOLUTION: | | 0 TO 65,532 DAYS SINCE 1/1/70 | 1 TO 255 | 0 TO 86,401 1 | -131.072 TO 131.056 0.004 | |

PAYLOAD REQUEST (FORMALLY DIGEST REQUEST)
USED BY THE SERVER TO REQUEST DATA TRANSMISSIONS FROM THE LMU. CAN BE USED TO REQUEST ANY PAYLOAD TYPE THAT THE CHANNEL SUPPORTS.

| CHANNEL NUMBER (2-BYTES) | 120 | DIGEST MODE | PAYLOAD TYPE TO RETURN |
|---|---|---|---|

(ENUM)

0x00 = TRANSMIT CURRENT DIGEST (CONTINUE IN DIGEST MODE)
0x01 = SWITCH TO DIGEST MODE
0x02 = TRANSMIT A REAL-TIME DATUM
0x03 = SWITCH TO REAL-TIME MODE (IF CURRENTLY IN DIGEST MODE, TRANSMIT DIGEST FIRST)
0xF0 = PAYLOAD REQUEST ACKNOWLEDGED
0xF1 = PAYLOAD TRANSMISSION ACKNOWLEDGED
0xF2 = ERROR (MAY BE USED BT MTC TO FLAG ILLOGICAL/UNSUPPORTED REQUEST)
0xFF = INVALID (NOOP)

ECHO REQUEST  MOSTLY USED FOR DEBUGGING COMMUNICATIONS RECEIVED BY LMU, IT IMMEDIATELY RETURNS AN ECHO REQUEST WITH REQUESTMODE=0x00, AND A STRING VALUE.
GENERALLY, WHETHER THE INITIATOR OR RESPONDER, THE STRING IN THE PAYLOAD IS PRINTED/COPIED TO SOME DEBUG/LOG FACILITY BY THE RECEIVER.

| CHANNEL NUMBER (2-BYTES) | 130 | REQUEST MODE | STRING LENGTH | STRING PAYLOAD TO DISPLAY (0 TO 32 ACII CHARACTERS) |
|---|---|---|---|---|
| | | (ENUM) | 0 TO 655.32 | |

0x00 = RESPONSE TO REQUEST
0x01 = REQUEST AN STRING DETERMINED BY RECEIVER
0x02 = 0xFE = TBD
0xFF = NULL/NOP

CONTINUED FROM THE PREVIOUS SHEET

WIND DATA

| CHANNEL NUMBER (2-BYTES) | 30 | TIMESTAMP DATE (DAYS) (2-BYTES) | TIMESTAMP TIME (SEC) (3-BYTES) | WIND SPEED (M/S) (2-BYTES) | WIND DIRECTION RELATIVE (RAD) (2-BYTES) | WIND DIRECTION TRUE (RAD) (2-BYTES) | WIND DIRECTION MAGNETIC (RAD) (2-BYTES) |
|---|---|---|---|---|---|---|---|
| RANGE: | | 0 TO 65,532 DAYS SINCE 1/1/70 | 0 TO 86,401 1 | 0 TO 655.32 0.01 | 0 TO 2π 0.0001 | 0 TO 2π 0.0001 | 0 TO 2π 0.0001 |
| RESOLUTION: | | | | | | | |

ENVIRONMENTAL DATA

| CHANNEL NUMBER (2-BYTES) | 40 | TIMESTAMP DATE (DAYS) (2-BYTES) | TIMESTAMP TIME (SEC) (3-BYTES) | HUMIDITY (%) (2-BYTES) | ATMOSPHERIC PRESSURE (PA) (2-BYTES) | TEMPERATURE (°C) (2-BYTES) |
|---|---|---|---|---|---|---|
| RANGE: | | 0 TO 65,532 DAYS SINCE 1/1/70 | 0 TO 86,401 1 | -131.072 TO 131.056 0.004 | -3,276,800 TO 3,276,700 100 | 0 TO 655.32 0.01 |
| RESOLUTION: | | | | | | |

GEOFENCE DATA

| CHANNEL NUMBER (2-BYTES) | 50 | TIMESTAMP DATE (DAYS) (2-BYTES) | TIMESTAMP TIME (SEC) (3-BYTES) | CENTER LATITUDE (DEG) (2-BYTES) | CENTER LONGITUDE (DEG) (2-BYTES) |
|---|---|---|---|---|---|
| RANGE: | | 0 TO 65,532 DAYS SINCE 1/1/70 | 0 TO 86,401 1 | ±90 1X10-7 | ±180 1X10-7 |
| RESOLUTION: | | | | | |

GEOFENCE SETTINGS

| CHANNEL NUMBER (2-BYTES) | 51 | TIMESTAMP DATE (DAYS) (2-BYTES) | TIMESTAMP TIME (SEC) |
|---|---|---|---|
| RANGE: | | 0 TO 65,532 DAYS SINCE 1/1/70 | |
| RESOLUTION: | | | |

TANK DATA

| CHANNEL NUMBER (2-BYTES) | 60 | TIMESTAMP DATE (DAYS) (2-BYTES) | TIMESTAMP TIME (SEC) (3-BYTES) | FLUID TYPE | FLUID LEVEL (%) (2-BYTES) | TANK CAPACITY (CU-M) (4-BYTES) |
|---|---|---|---|---|---|---|
| RANGE: | | 0 TO 65,532 DAYS SINCE 1/1/70 | 0 TO 86,401 1 | (ENUM) 0x00 = FUEL 0x01 = FRESH WATER 0x02 = WASTE WATER 0x03 = LIVE WELL 0x04 = OIL 0x05 = BLACK WATER (SEWAGE) 0x06 = FUEL (GASOLINE) | -131.072 TO 131.056 0.004 | 0 TO 4X10⁵ (APPROX) 0.0001 |
| RESOLUTION: | | | | | | |

SWITCHBACK STATUS (USUALLY SENT FROM MTC TO SERVER)

| CHANNEL NUMBER (2-BYTES) | 70 | TIMESTAMP DATE (DAYS) (2-BYTES) | TIMESTAMP TIME (SEC) (3-BYTES) | SUB CHANNEL (2-BYTES) | SWITCH STATUS COUNT | SWITCH ID (1-BYTE) | SWITCH STATE | SWITCH ID (1-BYTE) | SWITCH STATE | UP TO 252 SWITCH ID - STATE PAIRS |
|---|---|---|---|---|---|---|---|---|---|---|
| RANGE: | | 0 TO 65,532 DAYS SINCE 1/1/70 | 0 TO 86,401 1 | | 0 TO 252 NUMBER OF SWITCH ID-PAIRS THIS TRANSMISSION | (ENUM) | (ENUM) | (ENUM) | (ENUM) | |
| RESOLUTION: | | | | | | | | | | |

SWITCHBACK CONTROL (USUALLY SENT FROM SERVER TO MTC)

| CHANNEL NUMBER (2-BYTES) | 71 | TIMESTAMP DATE (DAYS) (2-BYTES) | TIMESTAMP TIME (SEC) (3-BYTES) | SUB CHANNEL (2-BYTES) | SWITCH COMMAND COUNT | SWITCH ID (1-BYTE) | SWITCH COMMAND (1-BYTE) | SWITCH ID (1-BYTE) | SWITCH COMMAND | UP TO 252 SWITCH ID - STATE PAIRS |
|---|---|---|---|---|---|---|---|---|---|---|
| RANGE: | | 0 TO 65,532 DAYS SINCE 1/1/70 | 0 TO 86,401 1 | | 0 TO 252 NUMBER OF SWITCH ID-COMMAND PAIRS THIS TRANSMISSION | (ENUM) | (ENUM) | (ENUM) | (ENUM) | |
| RESOLUTION: | | | | | | | | | | |

CONTINUED ON NEXT SHEET

FIG. 7B
(CONTINUED)

CONTINUED FROM THE PREVIOUS SHEET

| STATE ENUMS | COMMAND ENUMS | MEANING |
|---|---|---|
| 0000 | | CIRCUIT OFF (CMD OFF) |
| 0001 | | CIRCUIT ON (CMD OFF) |
| 0010 | | (RESERVED) |
| 0011 | 0011 | COMMAND CIRCUIT TO OFF |
| 0100 | | CIRCUIT OFF (CMD ON) |
| 0101 | | CIRCUIT ON (CMD ON) |
| 0110 | | (RESERVED) |
| 0111 | 0111 | COMMAND CIRCUIT TO ON |
| 1000 | | CIRCUIT OFF (CMD ERROR) |
| 1001 | | CIRCUIT ON (CMD ERROR) |
| 1010 | | CIRCUIT ERROR (CMD ERROR) |
| 1011 | | CIRCUIT UNKNOWN (CMD ERROR) |
| 1100 | | CIRCUIT OFF (NO CMD PENDS) |
| 1101 | | CIRCUIT ON (NO CMD PENDS) |
| 1110 | | CIRCUIT ERROR (NO CMD PENDS) |
| 1111 | 1111 | UNKNOWN/NO CHANGE |

SWITCHBACK DESCRIPTION

| CHANNEL NUMBER (2-BYTES) | 72 | TIMESTAMP DATE (DAYS) (2-BYTES) | TIMESTAMP TIME (SEC) (3-BYTES) | SUB CHANNEL (2-BYTES) | SWITCH ID | LABEL TYPE (1-BYTE) | LABEL SIZE (1-BYTE) | LABEL |
|---|---|---|---|---|---|---|---|---|
| RANGE: | | 0 TO 65,532 | 0 TO 86,401 | | | (ENUM) | | (0 TO 250 ASCII OR 0 TO 125 UNICODE) |
| RESOLUTION: | | DAYS SINCE 1/1/70 | 1 | | | 0 = NO LABEL<br>1 = ASCII<br>2 = UNICODE (FUTURE) | | NUMBER OF BYTES TRANSMITTED IS INDICATED IN LABEL SIZE (NO DELIMITER AT END).<br>IF LABEL TYPE=0, THEN LABEL SIZE WILL BE SET TO 0 AND WILL BE THE LAST VALUE TRANSMITTED. |

SWITCHBACK UI SELECTION (USUALLY SENT FROM SERVER TO MTC)

| CHANNEL NUMBER (2-BYTES) | 73 | TIMESTAMP DATE (DAYS) (2-BYTES) | TIMESTAMP TIME (SEC) (3-BYTES) | SUB CHANNEL (2-BYTES) | SWITCH UI SELECTION COUNT | SWITCH ID (1-BYTE) | SWITCH TYPE | SWITCH ID (1-BYTE) | SWITCH TYPE | UP TO 252 SWITCH ID - STATE PAIRS |
|---|---|---|---|---|---|---|---|---|---|---|
| RANGE: | | 0 TO 65,532 | 0 TO 86,401 | | 0 TO 252 | | (ENUM) | | (ENUM) | |
| RESOLUTION: | | DAYS SINCE 1/1/70 | 1 | | NUMBER OF SWITCH ID-COMMAND PAIRS THIS TRANSMISSION | | | | | |

SWITCH TYPE ENUM   FLAG MEANING
0 = SWITCH IGNORED
1 = SWITCH SELECTED FOR DISPLAY
2 = RESERVED
3 = MODE SELECTED FOR DISPLAY
4 = RESERVED
5 = SWITCH IS DISPLAY ONLY
6 TO 254 RESERVED
0xFF (255)

FIG. 7B
(CONTINUED)

BIT DEFINITIONS FOR THE ENGINE DISCRETE STATUS 1 & 2 MESSAGES
FORWARDED FROM THE NMEA 2000 INTERFACE ARE IDENTIFIED BELOW

ENGINE DISCRETE STATUS 1
xxxx xxxx xxxx xxx1 = CHECK ENGINE,
xxxx xxxx xxxx xx1x = OVER TEMPERATURE,
xxxx xxxx xxxx x1xx = LOW OIL PRESSURE,
xxxx xxxx xxxx 1xxx = LOW OIL LEVEL,
xxxx xxxx xxx1 xxxx = LOW FUEL PRESSURE,
xxxx xxxx xx1x xxxx = LOW SYSTEM VOLTAGE,
xxxx xxxx x1xx xxxx = LOW COOLANT LEVEL,
xxxx xxxx 1xxx xxxx = WATER FLOW,
xxxx xxx1 xxxx xxxx = WATER IN FUEL,
xxxx xx1x xxxx xxxx = CHARGE INDICATOR,
xxxx x1xx xxxx xxxx = PREHEAT INDICATOR,
xxxx 1xxx xxxx xxxx = HIGH BOOST PRESSURE,
xxx1 xxxx xxxx xxxx = REV LIMIT EXCEEDED,
xx1x xxxx xxxx xxxx = EGR SYSTEM,
x1xx xxxx xxxx xxxx = THROTTLE POSITION SENSOR,
1xxx xxxx xxxx xxxx = ENGINE EMERGENCY STOP MODE
WHERE x = DON'T CARE
INACTIVE STATES SHALL BE TRANSMITTED AS 0.

ENGINE DISCRETE STATUS 2
xxxx xxxx xxxx xxx1 = WARNING LEVEL 1,
xxxx xxxx xxxx xx1x = WARNING LEVEL 2,
xxxx xxxx xxxx x1xx = POWER REDUCTION,
xxxx xxxx xxxx 1xxx = MAINTENANCE NEEDED,
xxxx xxxx xxx1 xxxx = ENGINE COMM ERROR,
xxxx xxxx xx1x xxxx = SUB OR SECONDARY THROTTLE,
xxxx xxxx x1xx xxxx = NEUTRAL START PROTECT,
xxxx xxxx 1xxx xxxx = ENGINE SHUTTING DOWN,
xxxx xxx1 xxxx xxxx = RESERVED,
xxxx xx1x xxxx xxxx = RESERVEDR,
xxxx x1xx xxxx xxxx = RESERVED,
xxxx 1xxx xxxx xxxx = RESERVED,
xxx1 xxxx xxxx xxxx = RESERVED,
xx1x xxxx xxxx xxxx = RESERVED,
x1xx xxxx xxxx xxxx = RESERVED,
1xxx xxxx xxxx xxxx = RESERVED,
WHERE x = DON'T CARE
INACTIVE STATES SHALL BE TRANSMITTED AS 0. RESERVED AND UNSUPPORTED
STATES SHALL BE TRANSMITTED AS 0

FIG. 7C

DEFINITIONS FOR FUNCTION CODE FIELDS IN THE CHANNEL IDENTITY MESSAGE (PAYLOAD 1)

| CHANNEL FUNCTION | CHANNEL SUBFUNCTION | FUNCTION CODE | SUBFUNCTION CODE | DESCRIPTION | | BINARY MASK | | AVAIL |
|---|---|---|---|---|---|---|---|---|
| MTC | ?? | TBD | 0 | RESERVED FOR INFORMATION ABOUT MTC OPERATION | 0 TO 127 | 0xxx xxxx | GENERAL PURPOSE | 128 |
| ENGINE | DEFAULT | 20 | 0 | ENGINE PARAMETERS (RPM, FUEL CONSUMPTION, ETC.) | 128 TO 191 | 10xx xxxx | | 64 |
| ENGINE | PROPULSION | 20 | 10 | ENGINE PARAMETERS (RPM, FUEL CONSUMPTION, ETC.) | 192 TO 223 | 110x xxxx | | 32 |
| ENGINE | GENERATOR | 20 | 20 | ENGINE PARAMETERS PLUS ELECTRICAL GENERATION (VOLTS, AMPS) | 224 TO 239 | 1110 xxxx | | 16 |
| ENGINE | TBD | 20 | TBD | | 240 TO 255 | 1111 xxxx | SPECIFIC OPERATIONS | 16 |
| LOCAL WIND | | 30 | 0 | WIND SPEED, DIRECTION AND 15 MINUTE MAXIMUM GUST | | | | |
| ENVIRONMENT | | 40 | 0 | TEMPERATURE, HUMIDITY, AND ATMOSPHERIC PRESSURE AT A LOCATION WITHIN OR EXTERNAL TO THE VESSEL | | | | |
| NAVIGATION | | 50 | 0 | NAVIGATION DATA SUCH AS SHIPS POSITION, SPEED, AND HEADING | | | | |
| DEPTH | | 60 | 0 | DEPTH DATA PRIMARILY DIGITAL | | | | |
| DIGITAL SWITCHING | | 70 | 0 | SWITCHING SYSTEM CONFIGURATION AND CONTROL | | | | |
| DIGITAL SWITCHING | | 70 | 10 | SWITCH STATUS FOR ONE OR MORE SWITCHES | | | | |
| IGNORED | | 240 | 0 | IGNORE DEVICE/PGN | | | | |
| UNDEFINED | | 255 | xx | UNDEFINED, SUBFUNCTION CODE IRRELEVANT | | | | |
| GREEN LINES | | | | (CHANNEL CLASSES NOT REPRESENTED IN MTC RELEASE) | | | | |

CHANNEL FUNCTION, CHANNEL SUBFUNCTION, AND CHANNEL FUNCTION ENUMERATION

FIG. 7D

DATA TRANSMISSION SYSTEM

INCORPORATION BY REFERENCE

This application is a continuation application of and claims priority under 35 U.S.C. § 120 to U.S. application Ser. No. 16/945,693, filed on Jul. 31, 2020, entitled "DATA TRANSMISSION SYSTEM", which incorporates by reference U.S. Published Patent Application No. 2020-0064466 published on Feb. 27, 2020, which is incorporated by reference in its entirety.

FIELD OF THE INVENTION

This present invention relates generally to data transmission and more particularly to a system for efficiently transmitting data concerning the status of the operational systems of a boat or other vehicle. More particularly, the present invention relates to a device that can dynamically create new data channels for the operational systems of the boat or vehicle.

BACKGROUND OF INVENTION

Modern ships and boats, and other types of vessels and vehicles, frequently are equipped with many on-board operational systems for operation and control. These systems can include bilge pumps, multiple engines, location tracking and positioning devices, security systems, power and battery systems, gyroscopic stabilization systems, wind data, etc., each having various amounts of relevant data that can be measured and tracked. The marine environment is harsh and poses a number of non-trivial challenges not faced by other fields. Moisture, temperature, salt, and many other marine-specific factors can damage marine electronic devices. Therefore, it is desirable to have the ability to remotely monitor the status of these operational systems. The remote monitoring of the operational systems of ships and boats can ensure smooth operation, prevent damage to the boat and its many operational systems, and perhaps more importantly, give peace of mind to the boat owner.

Each vessel or vehicle can have a unique combination of operational systems, which each create data related to the operating conditions of the ships and boats.

A cellular Internet of Things (IoT) system is designed to handle small but frequent transmissions over a cellular network. Accordingly, the amount of data that is collected from these operational systems generally is too large to be transmitted by standard IoT devices because it exceeds the throughput capability of some IoT connections. Therefore, the amount of data that is transmitted must be kept to a minimum (e.g., $1/30^{th}$ of a megabyte), while at the same time allowing for the transmission of data related to important conditions in the operational systems of the boat.

SUMMARY OF THE INVENTION

At least one embodiment of the present invention is directed to a system, device and method for transmitting data from operational systems of a ship or other vehicle including devices that monitor data from the on-board operational systems to a user. The system, device and method determine what operational ship system data can be acquired and when and what acquired data should be transmitted. This makes it possible to limit transmitted data to the minimum necessary to report significant conditions for only those ship systems present.

In at least one embodiment, the machine-type communication device comprises a receiver that receives sensor data from a plurality of operational systems, a cellular connection for transmitting the data from the marine electronic device to a cloud network and a processor that dynamically creates data channels based on the plurality of operational systems, and performs a volatility assessment to determine when to save the data for transmission to the could network and when to transmit the data to the cloud network. In this embodiment, unknown operational systems can be identified and a new channel can be created to interact with the identified operational system. The processor can create new channels in the device and in the cloud network for the plurality of operational systems. Also, the processor can link sensor data to pre-existing channels and create a new channel when unknown operational systems are identified or detected. The unknown operational systems can be identified when an incoming PGN is not linked to an existing channel. The receiver can receive the data through a bus connected to the device and the bus can be a CAN bus. The plurality of operational systems can be selected from a group comprising: engine, fluid tanks, depth finders, bilge sensors, bilge pumps, wind sensors, location tracking and positioning devices, gyroscopic stabilization systems, GPS sensors, security systems, environment sensors, power systems, geo-fence sensors, battery monitoring sensors, engine metrics sensors, security sensors, shore power sensors, temperature sensors, remote switching sensors, and fluid tank sensors.

When performing the volatility assessment, the processor can determine whether a change in the data exceeds a predetermined threshold, which can be based on a percent difference, an absolute difference, or a combination of a percent difference, an absolute difference. The processor can use data averaging to perform the volatility assessment. A normal average or a rolling average can be used for the data averaging.

In one embodiment, the rolling average is computed using 15 primary samples and 60 secondary samples to realize a 15 minute simple moving average of samples taken every second.

The invention also can be implemented as a method of monitoring and transmitting sensor data from a plurality of operational systems comprising receiving sensor data from a plurality of operational systems, transmitting the data from the marine electronic device to a cloud network, dynamically creating data channels based on the plurality of operational systems and performing a volatility assessment to determine when to save the data for transmission to the could network and when to transmit the data to the cloud network. In this method of claim 15, unknown operational systems can be identified and a new channel can be created to interact with the identified operational system. In this method, new channels can be created in the device and in the cloud network for the plurality of operational systems.

Also, in this method, the sensor data can be linked to pre-existing channels and a new channel can be created when unknown operational systems are identified or detected and unknown operational systems can be identified when an incoming PGN is not linked to an existing channel. Also, the data can be received through a bus connected to the device and the bus can be a CAN bus.

Also, in this method the plurality of operational systems can be selected from a group comprising: engine, fluid tanks, depth finders, bilge sensors, bilge pumps, wind sensors, location tracking and positioning devices, gyroscopic stabilization systems, GPS sensors, security systems, environment sensors, power systems, geo-fence sensors, battery monitoring sensors, engine metrics sensors, security sensors, shore power sensors, temperature sensors, remote switching sensors, and fluid tank sensors. Also, this method can include the determining whether a change in the data exceeds a predetermined threshold when performing the volatility assessment.

In this method the predetermined threshold can be based on a percent difference, an absolute difference, or a combination of a percent difference, an absolute difference. Further, data averaging can be used to perform the volatility assessment. In this method, a normal average or a rolling average can be used for the data averaging. The rolling average can be computed using 15 primary samples and 60 secondary samples to realize a 15-minute simple moving average of samples taken every second.

The invention also can be implemented as instructions stored on a non-transitory computer readable medium that, when executed by a processing device, perform the above-described methods.

These and other features and advantages will be apparent from a reading of the following detailed description and a review of the associated drawings. It is to be understood that both the foregoing general description and the following detailed description are explanatory only and are not restrictive of aspects as claimed.

BRIEF DESCRIPTION OF THE DRAWINGS

The invention will be more fully understood by reference to the detailed description, in conjunction with the following figures, wherein:

Figure 7B:
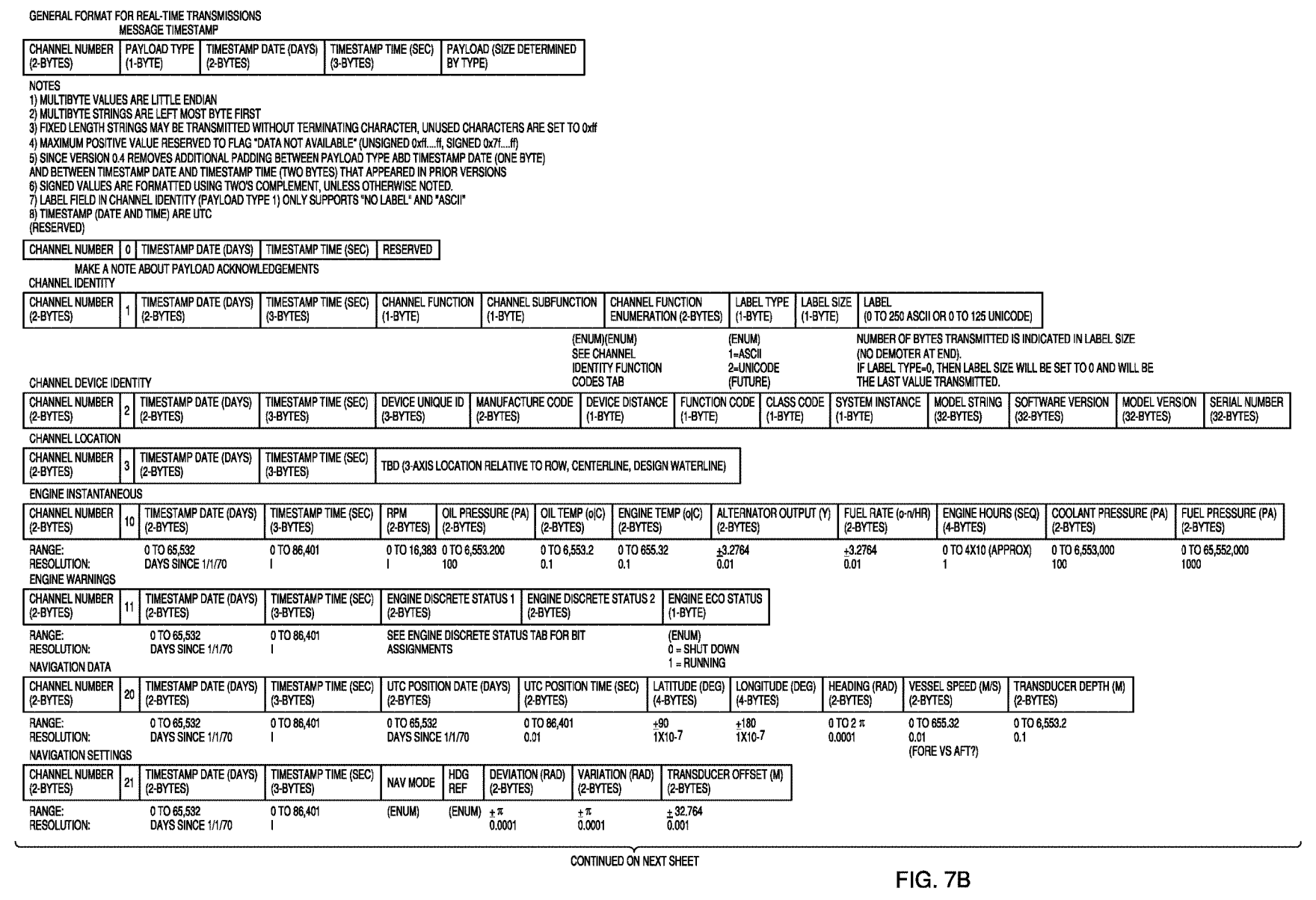

FIGS. 7A-7D show example payload formats.

DETAILED DESCRIPTION

Figure 1:
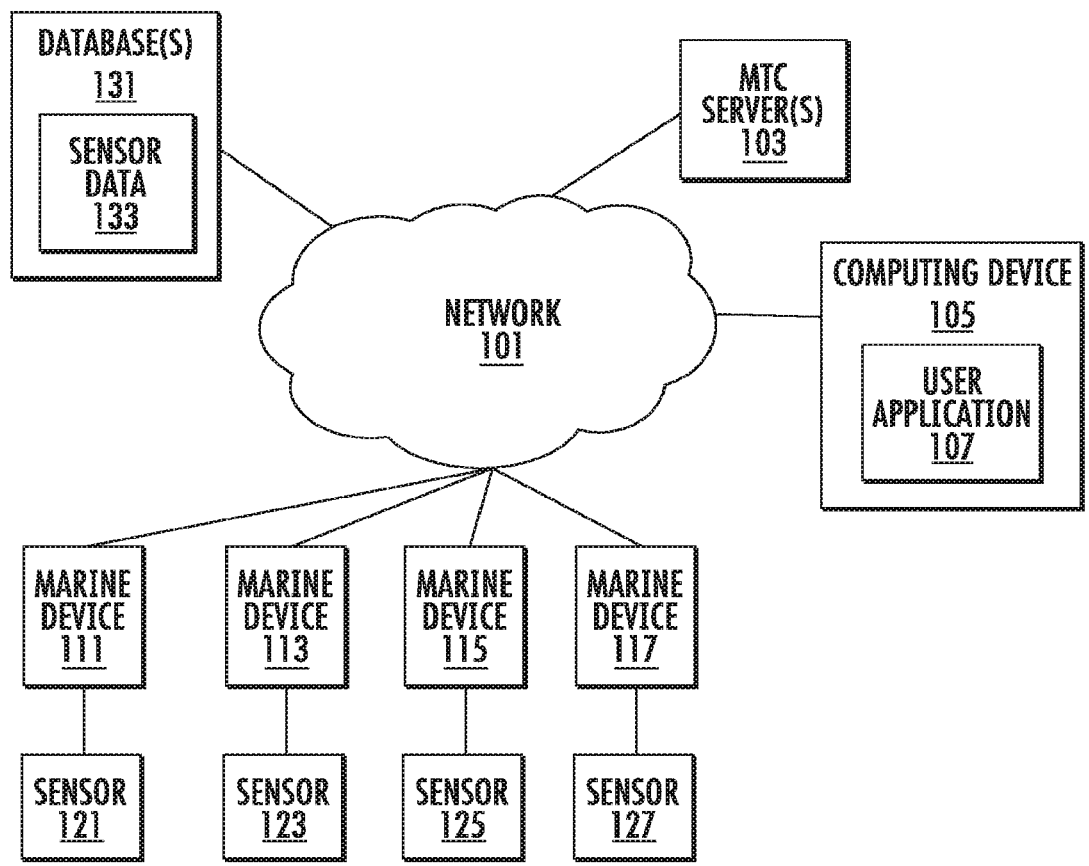
FIG. 1 shows an exemplary Machine Type Communications (MTC) environment.

The subject innovation is now described with reference to the drawings, wherein like reference numerals are used to refer to like elements throughout. In the following description, for purposes of explanation, numerals specific details are set forth in order to provide a thorough understanding of the present invention. It may be evident, however, that the present invention may be practiced without these specific details.

A marine vessel, such as a ship or boat, generally includes one or more operational systems to insure smooth operation. These systems can include, for example, engines, power and battery systems, gyroscopic stabilization systems, wind data, bilge pumps, location tracking and positioning devices, security systems, etc. Each operational system can include one or more sensors/devices that measure and monitor various metrics of the operational system such as oil pressure, engine speed, wind velocity, bilge level, etc. A boat monitoring system can be used to monitor the sensor data of these operational systems in order to ensure the operational capability of the boat and prevent damage and theft.

FIG. 1 illustrates a block diagram of an exemplary Machine Type Communications (MTC) environment that can be used with the present invention. Machine Type Communications (MTC) or Machine-to-Machine (M2M) communications enable direct communications from electronic devices to a central MTC server, or a set of MTC servers. Communications can use both wireless and fixed networks, in some embodiments. MTC enables a wide range of applications in many domains, impacting different environments and markets. These communication techniques can connect a potential number of electronic devices to the Internet and other networks, forming the so-called Internet of Things (JOT). In this exemplary block diagram, one or more MTC servers 103 are in communication with a computing device 105, one or more marine electronic devices (or electronic control units (ECUs)) 111, 113, 115, 117 located on a marine vessel, and a database 131 via a cloud network 101. The marine electronic devices are configured to connect to one or more wired or wireless marine sensors. As will be appreciated, the one or more servers 103, computing device 105 and/or database 131 can be local or remote, and various distributed or centralized configurations may be implemented, and in some embodiments a single computing device or server can be used. In exemplary embodiments, the computing device 105 can include a user application 107 through which a user can communicate with the system, access the data of the devices/sensors and provide information or user input.

In exemplary embodiments, the various electronic devices 111-117 can be in communication with, or can include, one or more sensors 121-127 in order to monitor various metrics of the boat. Throughout this application, the term "boat" is used as an example vehicle. But, the systems and method described herein can be used for any vehicle, such as boats, ships, automobiles, trucks, aircraft, trains, etc. This communication can be hard-wired or wireless. These sensors can include, for example, GPS sensors, geo-fence sensors, battery monitoring sensors, engine metrics sensors, bilge sensors, security sensors, shore power sensors, temperature sensors, remote switching sensors, depth finders, environmental sensors, fluid tank sensors, etc. The one or more servers 103, computing device 105, and one or more electronic devices 111-117 can communicate with each other and with the database 131, where sensor data 133 can be stored.

In exemplary embodiments, the computing device 105 may include, but is not limited to, smart phones, tablets, netbooks, laptops, computers, general purpose computers, wireless devices, portable devices, wearable computers, cellular or mobile phones, microprocessor-based or programmable consumer electronics, game consoles, and the like. The one or more servers 103, computing device 105, and one or more electronic devices 111-117 may connect to cloud network 101 via a wired or wireless connection. The cloud network 101 may include, but is not limited to, the Internet, an intranet, a LAN (Local Area Network), a CAN (Controller Area Network), a WAN (Wide Area Network), a MAN (Metropolitan Area Network), a wireless network, an optical network, and the like. The one or more servers 103, computing device 105, and one or more electronic devices 111-117 can transmit instructions to each other over the cloud network 101.

The one or more servers 103 and/or computing device 105 may include one or more non-transitory computer-readable media for storing one or more computer-executable instructions (such as but not limited to software or firmware) for implementing the methods and systems according to the principles described herein. The non-transitory computer-readable media can include, but are not limited to, one or more types of hardware memory, non-transitory tangible media (for example, one or more magnetic storage disks, one or more optical disks, one or more USB flashdrives), and the like. For example, memory included in the one or more servers 103 and/or computing device 105 can store computer-readable and computer-executable instructions or software for implementing exemplary embodiments and programmed to perform processes described herein.

In exemplary embodiments, the user application 107 can also enable remote switching, giving the user an ability to control onboard systems, such as cabin and cockpit lights, air conditioning, battery switches, and more. The electronic devices 111-117 can also be configured to sound an alarm or activate a strobe light in the event there is a critical event on a boat, such as high water in the bilge or unauthorized entry. The user application 107 can also provide graphic engine alert warnings with date and time indicators, highlighting the engine performance at the time of an alert. The user application 107 can track multiple engines. The user application 107 can also provide a listed summary of alert events, along with the time and date for easy look-up. In some embodiments, the user application 107 can include graphic real time engine on/off status, graphic indicators of fuel used at RPM and total fuel used over a selectable time, instant engine data refresh, a graphic fluid level display for multi-tank fuel, water, and waste tanks. The user application 107 can also enable alert forwarding to service providers or emergency responders. Notifications and alerts provided by the user application 107 can be grouped or prioritized by boat, by fleet, by alert type, by day, or by any other desirable filter.

In some embodiments, the electronic devices 111-117 can each be installed on one or more marine vessels or boats, with each electronic device being in communication with a number of sensors 121-127 aboard their respective boats. Thus, a single user application 107 on a computing device 105 can simultaneously monitor a fleet of boats, and metrics associated with each boat within the fleet, as long as each boat includes at least one electronic device connected to the computing device 105 via the network 101. In some cases, if connection between a marine electronic device and the computing device 105 and/or server 103 fails, the connection can be restored at a later time and communications/data can be updated.

Figure 2:
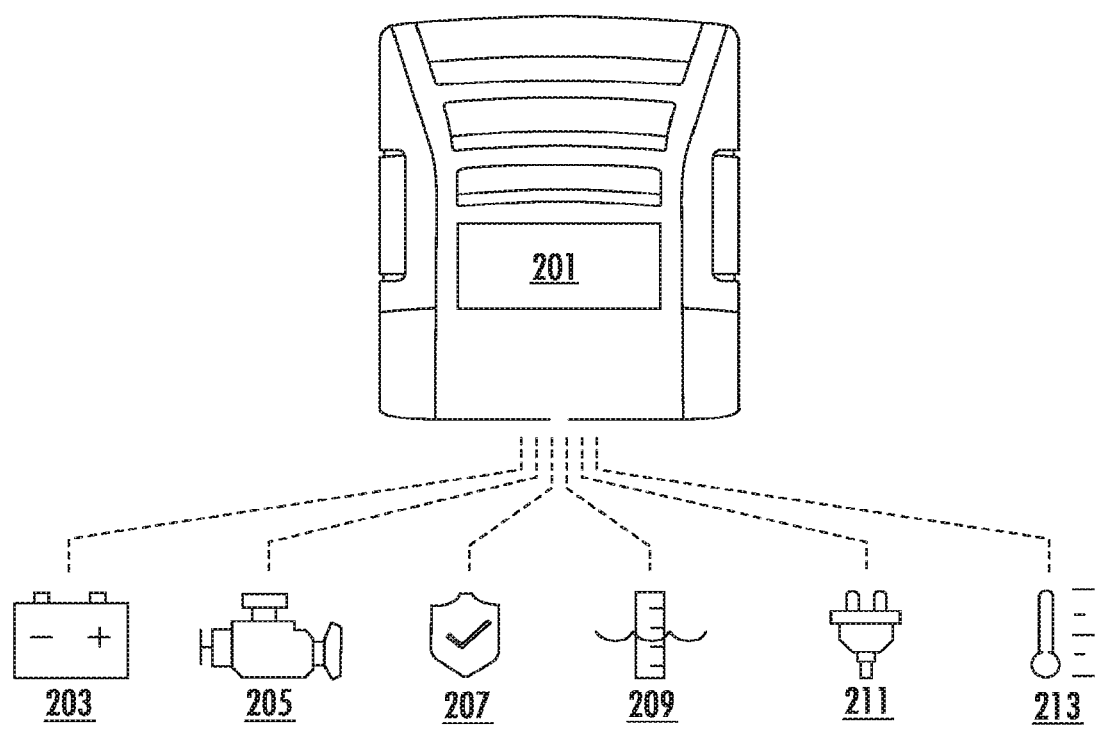
FIG. 2 shows an exemplary MTC architecture.

FIG. 2 illustrates an exemplary MTC architecture that can be used with the present invention. A marine electronic device 201 is illustrated in communications with a number of marine sensors 203-213. As will be appreciated, this MTC architecture is flexible, in that multiple wired and/or wireless sensors can be added easily to a single marine electronic device 201. The example sensors shown in FIG. 2 include, but are not limited to, a battery monitoring sensor 203, engine metrics sensors 205, security sensors 207, bilge sensors 209, shore power sensors 211, and temperature sensors 213.

In exemplary embodiments, the waterproof marine electronic device 201 may be affixed to an interior of a marine vessel. In one implementation, the marine electronic device 201 includes status LEDs (e.g., GPS (green)/cellular (red)), digital inputs, remote battery control, location technology (e.g., 56 channel GPS with SBAS), analog and digital outputs, temperature sensor input, etc. The marine electronic device 201 may also include, in some embodiments, a back-up battery, cellular or satellite connectivity (e.g., an internal antenna), GPS capability, terminal connectors for wired sensors, a wireless transceiver to support wireless sensors. The marine electronic device 201 may also include one or more of an external GPS antenna and/or satellite transceiver.

The marine electronic device 201 may be communicatively linked to a MTC server, which may be communicatively linked to a user computing device, as shown in FIG. 1. In exemplary embodiments, the marine electronic device 201 includes GPS tracking and geofencing that enables the MTC user linked to an MTC server to track the location and movements of a boat, and receive alerts if it leaves or enters a designated area. Moreover, with the bread crumbing feature, the user can review a complete history of where a boat has been.

In exemplary embodiments, the battery sensor 203 can monitor various batteries onboard a boat and send alerts when batteries fail or fall below a preset level. The system may generate an alert that can be sent to a user via the computing device if a battery fails or falls below the preset level. The user application 107 discussed above in FIG. 1 can also display current battery levels and voltages, in some embodiments.

In exemplary embodiments, the marine electronic device 201 may include engine metrics sensors 205, such as, ignition or oil pressure gauges to track engine hours. The system may generate an alert that can be sent to a user via the computing device, discussed above in FIG. 1, if the ignition is switched on. The user may also receive updates or reminders when the engine has logged a certain number of hours or is due for a service.

In exemplary embodiments, the marine electronic device 201 can be in communication with one or more security sensors 207. These security sensors can detect entry or motion on a boat, or the movement of doors or other fixtures on the boat. The marine electronic device 201 can connect to a variety of boat security sensors 207, including motion sensors, magnetic switches, canvas snap sensors, pressurized mats, and more. In addition to sending an alert through a user application 107, the marine electronic device 201 can automatically trigger an audible alarm and send alerts to multiple recipients.

In exemplary embodiments, the marine electronic device 201 can be in communication with a shore power sensor 211. The system may generate an alert if the boat gets disconnected from shore power or if there is a power outage at the dock.

Figure 3:
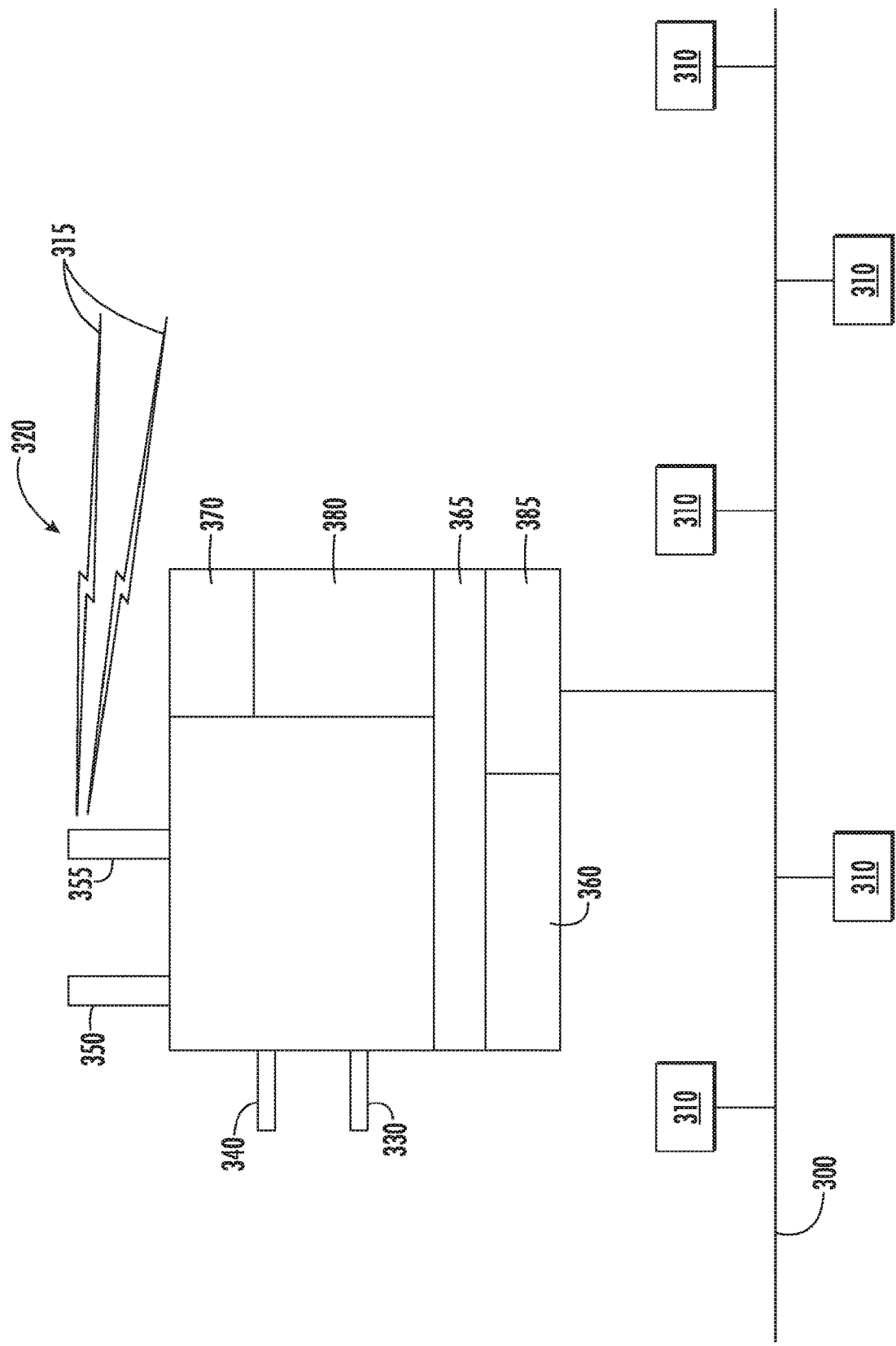
FIG. 3 shows the MTC device and how it connects to the vehicle systems.

As shown in FIG. 3, an exemplary embodiment of the system of the present invention operates with a bus, such as an NMEA (National Marine Electronics Association) CAN bus 300 or other CAN bus protocols such as SAE J1939, J1708 etc., to which a ship's operational systems 310 such as bilge pumps, multiple engines, tracking and positioning devices, security systems, power and battery systems, gyroscopic stabilization systems, wind data, etc. are coupled. Although the invention is described herein as using an NMEA CAN bus, any similar CAN bus could be used. The operational systems 310 send real-time data concerning the state of the operational systems to the CAN bus, such as oil pressure, engine speed, wind velocity, bilge level, etc. Alternatively, operational systems 315 send real-time data concerning the state of operational systems wirelessly, and could include the same kinds of data such as oil pressure, engine speed, wind velocity, etc. A marine electronic device 320 gathers information that is sent to the bus 300 by the operational systems 310, or sent wirelessly by the operational systems 315. The marine electronic device 320 can comprise various connections for receiving data from the operational systems 310, such as a wifi connection 330, a Bluetooth connection 340, a sub-gigaherz connection 355, etc., and a cellular connection 350 for transmitting data from the marine electronic device 320 to a server. The marine electronic device 320 also can include a processor 360 for controlling the various functions and systems of the marine electronic device 320, a machine-readable storage medium 370 on which is stored a set of instructions 380 (e.g., software) that cause the marine electronic device 320 to execute the desired functions that are described herein, base software layer 365, and a stack layer 385 that acts as a receiver for taking data from the operational devices 310. The machine-readable storage medium 370 includes any mechanism for storing information in a form (e.g., software, processing application, etc.)

readable by a computer. The machine-readable storage medium 370 may include, but is not limited to, a magnetic storage medium, optical storage medium, magneto-optical storage medium, read-only (ROM) memory, random-access memory (RAM), erasable programmable memory, flash memory, or any other type of machine-readable storage medium. The instructions 380 also could reside within a main memory within the electronic device 320. The instructions 380 also could be received over the network 101. For the processor 360, a STMictoelectronics STM32F microcontroller family, Renesas Synergy S5D9 microcontroller family, or comparable could be used. The instructions 380 are more fully explained below.

In exemplary embodiments, the electronic devices (electronic control units (ECUs)) 111-117 can be in communication with the sensors 121-127 via an NMEA 2000 CAN bus 300, or other suitable communication standard. A NMEA 2000 network, or other similar network, is designed to allow multiple electronic devices and systems to be connected together on a common backbone for the purpose of easily sharing information so that data can be transferred between multiple devices.

The network provides a data and control pathway to the various systems and subsystems on the vessel. Vessel systems are connected to the network through the one or more electronic control units (ECUs) that each provide information about one or more vessel system parameters and possibly provide the means to control a subsystem by changing those parameters. There are many useful cases where there is a one-to-one relationship between the ECU and the system or subsystem for which it is reporting parameters, but there is no limit to the number of ECUs that may report parameters for a single subsystem, nor is there a limit to the number of subsystems that may be reported from a single ECU. The methods and systems described herein are capable of recognizing and correlating data from a specific vessel system or subsystem, without regard to how many data sources may be required to form a complete picture.

Vessel data received on the network can be organized into one or more data channels. A data channel roughly corresponds to some system or subsystem on the vessel and represents a collection of data about a specific vessel component, system or subsystem. Examples of data channels include Engines, Tanks, Vessel Navigation, etc., but could include any number of additional systems and subsystems on the vessel. A channel may represent a single unit, such as an engine, or may represent a more complex system, such as a digital switching system with dozens of individual circuits. These data channels are created within the MTC firmware and within the cloud server to which the MTC connects.

The channel organization can extend to the cloud server and mobile application and can serve to organize communications between the end user and individual vessel systems. Where there are multiple components or systems of the same type aboard a vessel, there will be multiple channels of the same type. A channel's functional complexity will vary depending on the associated vessel system, ranging from simple data acquisition to complex monitoring and control. Channels may exist independently, or channels may be linked together to comprise a larger vessel function.

A channel designation reflects the authoritative source selection methodology for data that is physically acquired from the vessel. Each channel uniquely identifies the data acquisition source from among all the available data acquisition devices, for example devices 310 via NMEA 2000, or devices 315 via sub-gigahertz wireless. Since NMEA 2000 parameter groups, hereafter PGNs, can be transmitted from multiple sources on a network, a PGN is linked directly with its source to determine what vessel system the information in its payload pertains to. For example, there may be two GPS receivers on a vessel, and each GPS receiver may transmit the same PGNs containing values representative of the signals being received by that GPS unit. Within the vessel terminal, each GPS would be assigned to a different channel, so that the position data received can be clearly differentiated with respect to which unit received a particular position. Similar device dependencies exist relative to other data acquisition methods and communication channels. The remainder of this exemplary description will focus mainly on NMEA 2000.

Generally, an NMEA channel provides the resources to acquire data for a specific NMEA 2000 device type, process the data for transmission to the cloud servers, and respond to any cloud server requests to modify/update data or to control the device. The type and quantity of channels instantiated, or present, in a vessel terminal on a specific vessel can be determined when the vessel terminal is powered on, or reset, based on records stored in non-volatile memory.

Generally, there is a one-to-one relationship between a channel and a physical device. For example, if there are two Engines transmitting NMEA 2000 data, there will be two channels, one for each engine. However, channels can also represent an entire vessel subsystem, or may acquire data from multiple related NMEA 2000 devices. Examples include a digital switching system and/or a GPS receiver, heading sensor, and depth detector that are combined into a single Navigation channel. Each NMEA 2000 channel can consist of the following:

Channel Data Structure
Channel Initialization Function
PGN Acquisition Functions
Channel Processing Update Functions
Cloud NMEA Message Functions
Discovery Function The channel data structure is a data structure that defines all memory required for channel operation, including channel state and any channel specific data buffering. The channel initialization function, which is utilized for on vessel terminal initialization when a channel is present, is responsible for allocating and initializing memory for the Channel Data Structure, and for scheduling periodic processing as required to perform data sampling, as presented in more detail below.

PGN acquisition functions validate input data and update channel state and data buffers as required. There is one function for each PGN acquired by the channel. Channel processing update functions assess volatility, update data averaging, reset counters and buffers, etc. The number and nature of the channel processing update functions can be dependent on device specific requirements. Typically, these functions are scheduled to execute periodically by the Channel Initialization Function. Cloud NMEA message functions assemble data and construct a Payload for transmission to the cloud servers. The discovery function is the process whereby the ships operational systems 310 are identified as to their quantity and type, and a channel is generated for each that is present. Discovery is called when a PGN that is acquired by a specific type of channel is received, but the received PGN is not yet assigned (based on its source) to a channel. The discovery function generates the records in non-volatile memory that result in channel instantiation on vessel terminal power on or reset.

Channel initialization connects incoming PGNs to an appropriate channel for processing, and marshals the appropriate resources for each channel. Channel initialization can be performed when the vessel terminal powers-up or is reset to instantiate the channels identified for the vessel, and can comprise three steps: (1) source selection record population; (2) initializing each channel; and (3) populating the channel metadata array.

Figure 4:
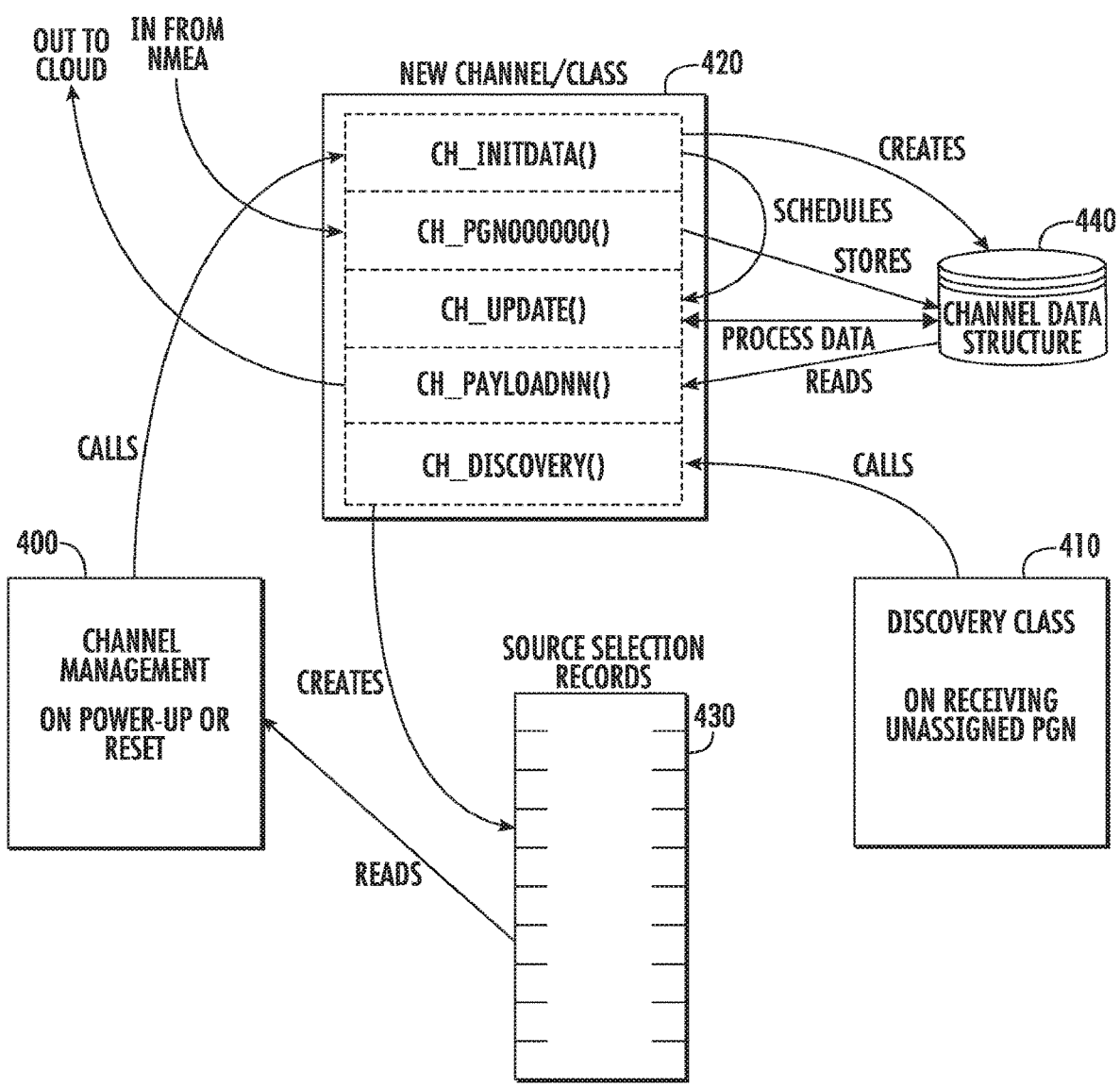
FIG. 4 shows some of the components involved in the initialization and operation of the channels

FIG. 4 shows some of the components involved in the initialization and operation of the channels. Additional detail on channel Initialization and discovery is provided below.

The system shown in FIG. 4 is responsible for ensuring that incoming data is routed to the correct channel and includes a channel management functional block 400, a discovery class functional block 410 and a new channel/class functional block 420. On initial installation, the source selection record set is empty, and is populated by the discovery process each time a new operational system is identified. The record sets are held in non-volatile memory 430 to retain information about the vessel between power cycles.

On power-up source selection records are retrieved from the source selection records non-volatile memory 430 and made available to the channel management functional block 400. The channel management functional block 400 uses the source selection records to steer incoming PGN's to the appropriate channel and to help identify each channel that needs to be instantiated.

Upon power-up the source selection records are scanned and one or more channels of the required types is initialized by the new channel/class function block 420 by calling its initialization function, and receiving back a pointer to the allocated and initialized channel data structure data object 440. As each operational channel is initialized, it is also identified in the channel metadata array, which contains information about each channel and also receives its channel data structure pointer. Channel initialization also occurs when a new channel is discovered, allowing new devices to come online at any time.

The channel metadata array is a fixed length array that is populated with the data related to each channel that has been initialized and is operational on the vessel terminal. The metadata array itself has only a minimal size with values that capture the status of an associated channel, along with two pointers to objects that are allocated and initialized at the time the channel is instantiated. The data objects can include ChannelIdentity, which is the object that contains static information pertaining to the vessel device that is the primary source of data for the channel (object is channel identity type, and ChannelData, which is the object that contains operational data used by the associated channel (object type is dependent on the type of channel). Other metadata can include: ChannelKey, ChannelType, and Flags: Valid, InUse. ChannelKey metadata is the non-volatile identifier used globally (vessel terminal, server, and mobile app) to uniquely identify the data associated with the channel. ChannelType metadata is the device/system/subsystem type to which the channel data pertains. Flags: Valid, InUse metadata are flags used to control access and prevent access to non-instantiated channels. A record in the Channel Metadata Array can be allocated during power-up channel instantiation and is initialized by invoking the initialization routine of the appropriate class. The record may also be allocated and initialized during discovery.

The channel's discovery function can be used for validating PGN sources for the PGNs the channel acquires, and then generating the required Source Selection Records. The channel's discovery function can be registered in the Channel Creation List according to the PGN that should trigger its execution. When a channel is designed to acquire multiple NMEA 2000 PGNs, the discovery process trigger is usually limited to a single PGN type, and the resulting Source Selection record for that PGN also usually becomes the key record that triggers channel instantiation.

The process for identifying PGNS that are received but have not yet been assigned a channel was described above. The identified PGN can then be used to select the appropriate channel discovery function from a channel discovery list, which is a preprogrammed list that matches PGNS that may be received to the types of channels that may use the data provided in the PUN. When invoked by a PGN arrival where there is no assigned channel, the channel discovery function first validates the PGN source to ensure that the channel has been designed to handle PGNs from that source. When a PGN—Source combination that is not handled by any existing channel type is identified, a special source selection record can be generated to keep that PUN from being evaluated repeatedly. Once the PGN—Source has been validated, the channel's discovery function can generate the Source Selection records for all PGNS that that particular source may generate. This may also include proprietary PGNS when appropriate.

Each time a PGN is received from the NMEA 2000 network, source selection can be performed on the PGN to determine how to route the received PGN payload. Source selection can be done by linking a particular received PGN to a channel. Each parameter group received by a device is characterized by both the source address it was received from and its parameter group number (PGN), which are both contained in the CAN Id header in the received frame. However, since source addresses in NMEA 2000 are assigned at run time and, in fact can change during operation, they are not reliable as a source selection differentiator on their own. Address Claim PGN, part of the source address arbitration process, provides the glue necessary for using the source address as a differentiator. The Payload PGN can contain a 64 bit value known as the NAME. The NAME for every device connected to an NMEA 2000 network is required to be unique, so a unique identity can be established by dereferencing the source address to the NAME in real-time.

In addition, NMEA messages may provide additional differentiators within the data payload of the message itself. Most common is an Instance field, which can be used when a device is transmitting multiple data sets, each representing a different measurement. Other differentiators that may be provided include secondary instances, the position of the field within the parameter group, and the definer tag used within proprietary parameter groups.

Figure 5:
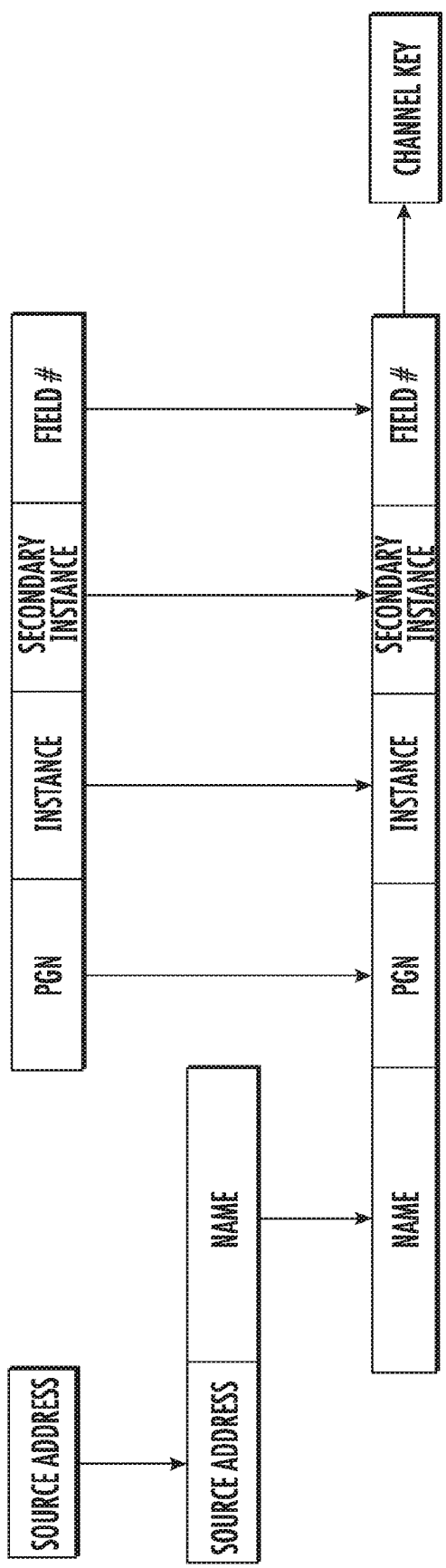
FIG. 5 shows how the correct channel is determined for an incoming PGN.

FIG. 5 shows how the correct channel is determined by channel management 400 for an incoming PGN. When the PGN arrives, PGN processing code is invoked. The PGN processing code parses the packet and requests a Source to NAME lookup. Once the NAME is determined, the source selection records non-volatile memory 430 are searched for a matching configuration. Once a channel is identified, the channel pointer and parsed PGN data is passed to a class PGN processing function. The top row in FIG. 5 shows the differentiators that are included with each PGN received. At a minimum, this includes the source address and the PGN itself. The middle row shows the task of looking up the NAME associated with the received source address. Then the resulting NAME, along with the remaining differentiators from the payload are combined together to generate the selection criteria to identify the correct source selection record in non-volatile memory (430). The source selection record contains the Channel Key.

The record indicated on the bottom row of FIG. 5 can be saved in non-volatile memory to survive power cycles of either the NMEA 2000 network or the vessel terminal. Since the NAME is unique, and constant across power cycles, the saved record ensures that a particular data source always receives the same channel key each time the NMEA 2000 network is powered up and each time the vessel terminal is restarted. Additional configuration information about the channel can also be stored in non-volatile memory along with the channel key.

Received PGNs may be characterized in many ways. In addition to known PGNs from known vessel system types, the vessel terminal may receive one of the following categories of PGNs. The first type are PGNs that are unknown to the vessel terminal, or which have no appropriate data acquisition or control process. These PGNs can be ignored. Many PGNs that are part of this category can be filtered out in the NMEA 2000 stack, and never make it to the vessel terminal application. The second type are PGNs that are known to the vessel terminal, but which are being used by a vessel system that in a way that is unknown to the vessel terminal. These PGNs also can be ignored. An example could be the Engine Parameters Dynamic, which is sometimes transmitted from an MED or fuel management system with composite multi-engine data. It is possible to only use direct engine data at the vessel terminal. The third type are Proprietary PGNs that may have different data within them according to the manufacturer responsible for defining their format. Some of these may be routed to an appropriate channel when the manufacturer format is known, while others using the same PGN number may be ignored because the manufacturer format is not known.

Discovery is the process Where previously unknown vessel systems can be identified and appropriate channel(s) are created to interact with the vessel system. Vessel systems can be initially discovered by the PGNs they transmit. Additional information, such as the source device's class and function code, can serve to identify the appropriate channel type.

As presented above, the MTC device 320 connects to a CAN bus 300. As described below, the MTC device 320 can dynamically create new data channels for unique devices found on the CAN bus 300. "Dynamically" means that the creation of new data channels is performed while operating in the field in response to the discovery of new data sources/devices. From a practical standpoint, compared to static data channel creation, "dynamic" data channel creation is more likely to result in a sufficient number of channels for the actual devices discovered in the field, which can prevent the wasting of resources on data channels that cannot be used. These data channels can be created within the MTC firmware and within the cloud server to which the MTC connects. The server recognizes and duplicates these channels, and presents the data using that organization. This makes it possible for the information received by the MTC to continue to expand so that it can communicate with all of the possible operational systems of a vessel.

Figure 6:
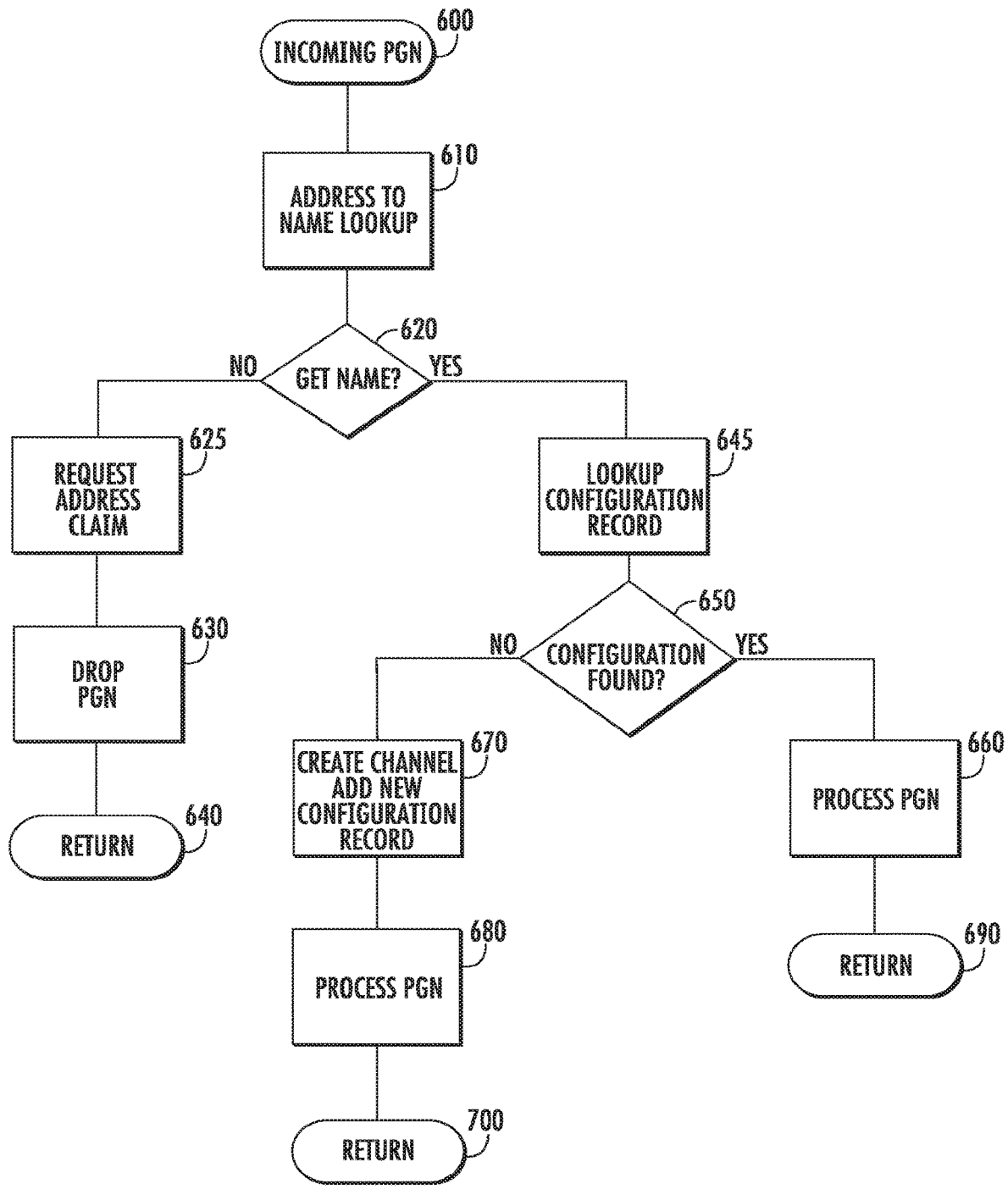
FIG. 6 shows the control flow used to incorporate discovery into PGN processing so that new devices can be dynamically added to the vessel.

FIG. 6 shows the control flow used to incorporate discovery into PGN processing so that new devices can be dynamically added to the vessel. As shown in FIG. 6, each time a PGN is received (Step 600), an address to NAME look-up is performed (Step 610), and it is tested to determine if the source device is also known (Step 620). When the source device NAME is unavailable (NO in Step 620), a request is initiated to gather information about the source (Step 625). Then, the PGN is just discarded (Step 630) and the process returns (Step 640). When the NAME is available (YES in Step 620), then it and other PGN information are used to search for the source selection record as described above. A successful search results in a channel key that is used to identify the channel to which the PGN payload is directed.

As shown in FIG. 6, when the source selection search fails (NO in Step 650), the PGN is passed along to the discovery process for further processing (Step 680) to identify the appropriate channel type or types to create, and to identify and create source selection records for each of the PGNs that are expected by the associated channel types (Step 670). Vessel systems may be supported by a channel that performs simple data acquisition, or may require a more interactive channel that monitors and controls the vessel system. When both source to NAME lookup and configuration record lookup are successful (YES in Step 650), the PGN is processed (see Step 660) per FIG. 5 and the process returns (Step 690). If source to NAME lookup fails (NO in Step 620), a request is initiated to gather information about the source (see Step 625). If the configuration fails (NO in Step 650), a new channel is generated and a new configuration record is added (see Step 670). The configuration records can be stored in non-volatile memory. A user API can be extended to provide ability to modify configuration records.

The following factors may be considered in selecting the appropriate channel types to configure.

The following values from the NAME, as defined in NMEA 2000 Standard for Serial-data Networking of Marine Electronic Devices
 NMEA defined Class Code
 NMEA defined Function Code
 NMEA defined Manufacturer
 Product Code (Product Information), as defined in NMEA 2000 Standard for Serial-data Networking of Marine Electronic Devices.

This Channel Discovery allows the system to adapt to an unlimited permutation of vessel systems and quantities, such as: a vessel with two engines and four tanks; or, a vessel with six engines and two tanks; or, a vessel with one engine, two tanks, and a single GPS; or, a sailing vessel with no engines, two tanks, a GPS and a wind speed and direction sensor; etc.

As mentioned, above, data acquisition involves the receipt of published data parameter groups (PGNs) each containing a group of related parameters, such as for example, engine speed, engine boost pressure, and engine tilt/trim. Published PGN default transmission periods generally can range from 0.1 to 2.5 seconds, and generally are assigned by NMEA based on industry requirements. Typically, the resolution and sampling rate are sufficient to support closed loop vessel control. As a result, the resolution and sampling rate of most PGNS often can be in excess of the resolution and sample rate required by some telematics products, which are primarily used to acquire data for display and archival analysis purposes. Also, as mentioned above, the amount of data that is collected from these operational systems generally is too large to be transmitted by standard IoT devices because it exceeds the throughput capability of some IoT connections. Therefore, the amount of data that is transmitted must be kept to a minimum (e.g., $\frac{1}{30}^{th}$ of a megabyte), while at the same time allowing for the transmission of data related to important conditions in the operational systems of the boat. Therefore, it is desirable to perform processing in such a way as to reduce the overall data volume on the communication channel between the onboard telematics units and cloud servers. This can be done by dynamically controlling when parameter values are transmitted such that parameter values transmitted represent the minimum sample quantity necessary to evaluate parameter trends, the parameter values transmitted have operational significance, and data is transmitted as efficiently as practical (low overhead). The definition of necessary sample quantity and operational significance may vary depending on the operational status of the vessel.

Generally, parameters sent to the cloud server are collected into a sample set in the same way that parameters are grouped on the NMEA 2000 network, and are transmitted to the cloud using a defined Message Payload Format. FIGS. 7A-7D show example payload formats. A sample set represents the measured state of the system or subsystem at a given point in time. A defined sample set may be comprised of any combination of key parameters and other parameters.

Key parameters are continuously evaluated to determine when the sample set needs to be saved, while the other parameters may be considered "along for the ride." A volatility assessment can be performed on each key parameter in the sample set to determine whether the difference between the last transmitted value and the current value exceeds a predetermined threshold. This can be done by percentage or absolute value. When the threshold is exceeded on any of the key parameter volatility assessments, then the entire sample set is saved, including both key and non-key parameters.

When a sample set is to be saved, it may be either transmitted immediately to the cloud server, or the sample set may be collected into a digest for later transmission. A digest is used to collect several sample sets into a single transmission so that any associated overhead, such as message headers and fixed message components, can be distributed across a number of samples, increasing data transmission volume efficiency. These digests, known as linear digests, usually have a fixed size, and are transmitted each time the digest is filled.

Digests may also be used to hold sample sets that have little operational significance unless some qualifying event occurs. When the digest, known as a circular digest, fills before the associated qualifying event, each new sample set can replace the oldest sample set remaining in the digest. Circular digests can be used to capture parameter values that may have occurred within a short window of time leading up to a qualifying event.

A sample set transmission is described herein. However, any sample set may be saved into a digest in lieu of real-time transmission. The values saved are still considered as the last value sent to the cloud server, and the cached value is updated accordingly.

Parameter volatility means how rapidly and how much a parameter value varies over time. Typical vessel operations typically are characterized by long periods during which parameter values remain relatively constant, interspersed with short periods where parameters values are changing rapidly and over a large value range. These observed characteristics can correspond to long periods of time when the vessel is cruising from one point to another, with brief periods where a vessel is maneuvering in close quarters.

Parameters that vary over an uninterrupted value range and where adjacent values are similar in meaning are considered continuous data. Continuous data volatility assessment is performed to ensure that parameter time histories include parameter variations that occur when maneuvering while still limiting the number of sample sets saved and ultimately transmitted to the cloud server. For a given defined set of parameters, the determination of when to save the parameter set can be based on two factors: (1) parameter value volatility as characterized by certain key parameters within the data set; (2) and a maximum time interval between successive sample sets.

Figure 8:
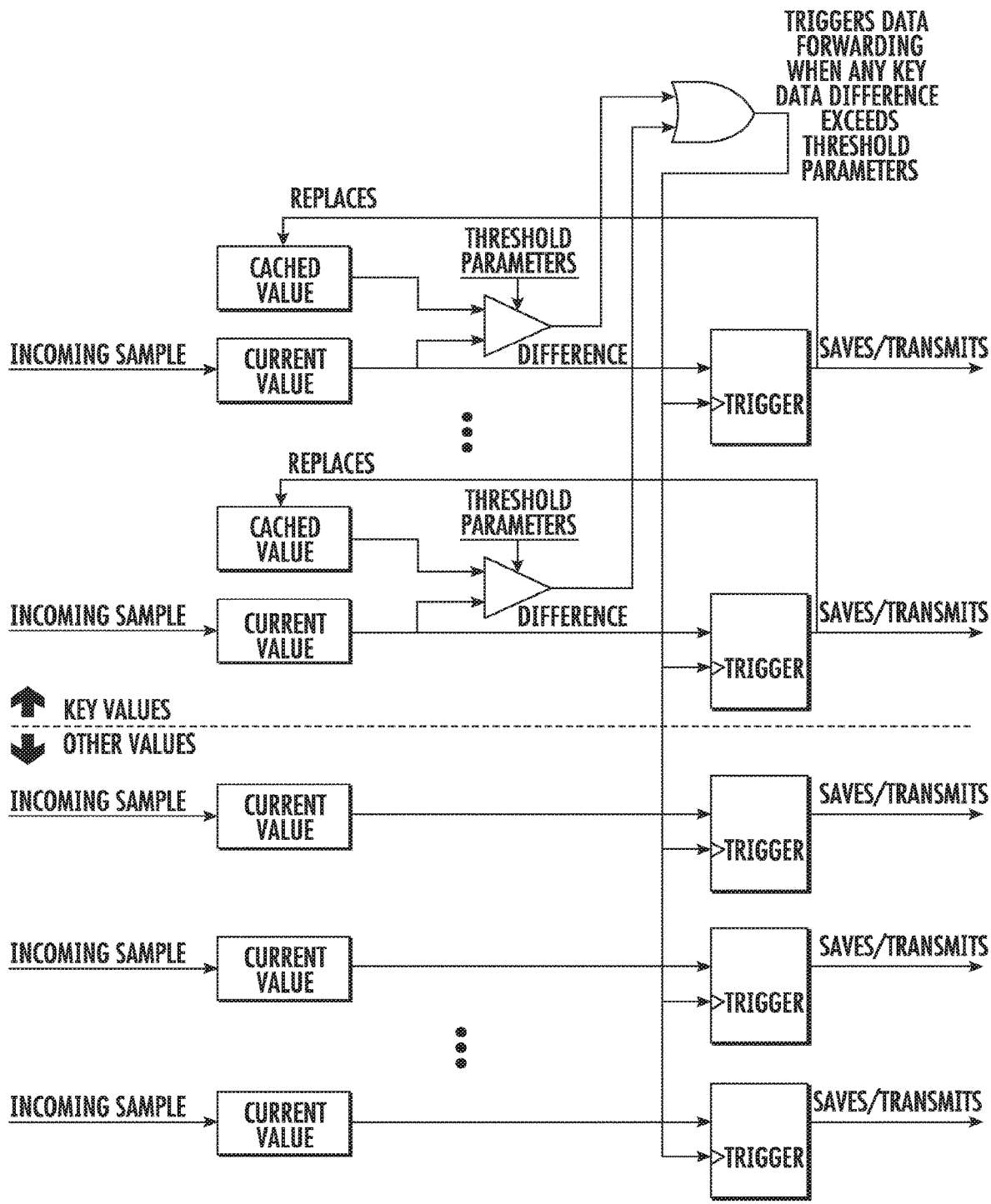
FIG. 8 shows a volatility assessment process.

The volatility assessment process is shown in FIG. 8. Two values are saved for each assessed parameter, the current (or most recent) value (Boxes 805/810) and a cached value representing the last value transmitted to the cloud server (Boxes 815/820). Periodically, the current values are compared against the cached values with differentiators 825/830. When the current and cached value difference is above a threshold, then the corresponding sample set can be transmitted with the current value of all parameters.

As shown in FIG. 8, not all acquired parameters are candidates for volatility assessment. Instead, certain key parameters within the sample set are identified and assessed periodically. When any of the key parameters associated with a sample set exceeds its threshold (see Or Gate 840), then all parameters in the sample set are transmitted, and the cached values of all key values are updated to reflect the values transmitted. Some examples of key parameters can include RPM, various temperatures and/or pressures, speeds, positions, and accelerations. An example of a parameter that would normally not be considered a key parameter is engine operating hours. Engine operating hours are well understood and highly predictable, and therefore not an indicator of significant operational events.

The thresholds can be based on a fractional difference and an absolute difference. Thresholds for key parameter volatility assessments can determined by the physical type (e.g., speed, temperature, pressure, volume, etc.) of the key parameter. Thresholds may be either percent difference or absolute difference, or a combination of both. Percent change thresholds tend to ensure that small changes at the lower range of a parameter are captured, while absolute value thresholds tend to ensure a uniform sample spread across the upper range of the parameter. A threshold also can be based on statistical measurements of the key data value; for example, wind data thresholds can be applied to a moving average of wind speed and not wind speed itself. This tends to suppress volatility due to transients. The use of other statistical measurements also could be used. For example, a percent difference of 10% applied to a cached engine speed value of 1500 RPM would be exceeded when the current engine speed value was less than 1350 RPM or greater than 1650 RPM. Also, a percent difference of 10% applied to a cached average wind speed value of 17.5 knots would be exceeded when the current average wind speed value was less than 15.75 knots or greater than 19.25 knots. Conversely an absolute difference of 1.0 knot applied to the same cached average wind speed value of 17.5 knots would already be exceeded when the current average wind speed value was less than 16.5 knots or greater than 18.5 knots.

In addition, a maximum sample time interval can be imposed. When the time interval elapses without any of the key parameter thresholds being exceeded, then all parameters in the sample set are transmitted, and the cached values of all key values are updated to reflect the values transmitted.

Discrete data parameter values, parameters that are represented by a single bit, or by a set of enumerations, each have a discrete meaning, and there is no continuous relationship between adjacent values. Any value change can be considered to be significant, and no change is more significant than any other.

Since any change of value is significant, discrete data volatility assessment is of limited value. Therefore, hysteresis can be applied to the discrete values in order to filter or block acquisition noise. As an example, discrete data hysteresis can be implemented in an "Engine Channel" for discrete engine warnings, as shown in the following table.

TABLE 1

| Transition | Minimum Persistence |
|---|---|
| Inactive to Active | 2.0 seconds |
| Active to Inactive | 4.0 seconds |
| Re-occurrence | 60 seconds. |

While the method of determining when a volatility threshold is different for discrete key data than for continuous key data, the result of the determination can still be used to trigger the transmission of the entire data set as shown in FIG. 8.

Data averaging is another way that incoming NMEA 2000 parameters can be processed to reduce the volume of data transmitted to the cloud server. Various averaging methods that can be employed comprise: an average (normal), in which the average over a specific time interval, where the time interval is less than the expected reporting interval; and a rolling/windowed average, in which that average over a specific time interval, where the time interval is equal to or greater than the expected reporting interval (SMA, or Simple Moving Average). The choice of whether to use averaging, and which averaging method to use can be based on the source and use of the data.

For example, when using a normal average, all NMEA 2000 data with a transmission interval of less than 1.0 seconds can be averaged to determine the average value for that second. The averaged value becomes the current value for the associated parameter. An example of a normal average can be Engine RPM. RPM data can be transmitted on the NMEA 2000 bus at 10 Hz. RPM can be averaged using a simple average to provide point in time values, which are then assessed for volatility. The following values can be maintained: (1) a one second average, which could be 10 samples plus the sample set average. Each time a new average is calculated the samples are discarded; (2) a cached transmit value (last value for the parameter transmitted to the backend); and (3) current value.

A rolling or windowed average can be applied to selected NMEA 2000 parameters so that the data reported reflects the trend of the data, and not the instantaneous value. An example of a rolling/windowed average is Wind Speed. Wind Speed generally is transmitted on the NMEA 2000 bus at 10 Hz. Wind speed can be averaged using a simple average to provide point in time values plus a Cascading Average algorithm that provides the rolling windowed average. The following values can be maintained:

One second average: 10 samples plus the sample set average; each time a new average is calculated the samples are discarded.

Fifteen second moving average: 15 samples plus average, the samples being collected once per second, using the one second average as input.

Fifteen minute moving average: 60 samples plus average, each sample being an average of fifteen one second samples.

A total of 85 samples plus three averages can be maintained, in addition to the cached values. The average of subset averages is equal to the average of the entire set as if the entire sample set (e.g., 60×15=900 values) had been available.

The one second average can be computed every second using the samples collected since the last average. The total number of samples is the number of actual valid samples received within one second—if only 9 samples are received, then the average is based on only those 9 samples. The result is added to the sample set for the fifteen second average. If the fifteen second average sample set is full, then a sample is removed before adding the new value. If there are no samples in the one second average sample set, then a sample is removed from the fifteen second sample set without replacing it. The fifteen second average can be computed every second using the values from the last fifteen (seconds/minutes). The fifteen-minute average can be updated with the value of the fifteen second average every fifteen seconds and the average is recomputed. So the fifteen second moving average and fifteen minute moving average are moving averages, but the one second average is a point in time average.

As used herein a key parameter is parameter value that is used to determine the volatility of the data represented by a sample set. This also can be referred to as a KeyDatum. A volatility assessment can be an ongoing evaluation of key parameters based on parameter value rate of change. Thresholds available for fractional change and absolute change. A cascading average can be used which is an implementation of a rolling/windowed average divided into a primary and secondary sample set. Example implementations could use 15 primary samples and 60 secondary samples to realize a 15-minute simple moving average (SMA) of samples taken every second. Real-Time can be a single sample set transmitted as a single packet to the cloud server. This can be transmitted at the time the decision to save/transmit the data sample is made. A linear digest is a buffer used to store consecutive sample sets so that they can be transmitted as a single record, resulting in more efficient data utilization (by volume). A circular digest is a buffer used to store consecutive sample sets with the provision that when the buffer is full, the oldest sample set is replaced by the current sample set. Transmission of circular digests can be conditioned on specific events.

Linear digests can be currently transmitted to the cloud on each of the following three events:
  (1) User request, initiated by refresh button on the N2K tiles
  (2) Daily, at UTC midnight (ensures that each day starts with a new digest)
  (3) When the digest fills to capacity, resetting the digest so it can continue to collect data.

Transmitting linear and circular digests can be based on other events.

An example of how to acquire engine data and forward it to the cloud server is presented below.

Input PGNs

The following NMEA 2000 PGNs can be captured by the Engine Class:

| PGN | Field | Captured Y/N? |
|---|---|---|
| Engine Parameters, Rapid Update (127488) | Engine Speed | KeyDatum |
| | Engine Boost Pressure | No |
| | Engine Tilt/Trim | No |
| Engine Parameters, Dynamic (127489) | Engine Oil Pressure | KeyDatum |
| | Engine Oil Temperature | KeyDatum |
| | Engine Temperature | KeyDatum |
| | Alternator Potential | Yes |
| | Fuel Rate | KeyDatum |
| | Total Engine Hours | Yes |
| | Engine Coolant Pressure | No |
| | Fuel Pressure | No |
| | Engine Discrete Status 1 | Discrete Hysteresis |
| | Engine Discrete Status 2 | Discrete Hysteresis |
| | Percent Engine Load | No |
| | Percent Engine Torque | No |

The following message formats can be used to transmit data from the engine class to the cloud server. Messages can be defined as one of either Real-time Tx, or Digest Tx format. Real-time Tx formats can contain only a single engine data sample, and can be transmitted to the cloud server at the selected sample time. Digest Tx message formats have the ability to contain up to 254 samples, depending on each digests memory allocation. For digests, the number of samples can be based on an 800 byte allocation per digest as implemented on the MTC. In this example, space can be reserved for fields identified within parenthesis ( ), but are not used. They can be transmitted using NMEA 2000 standard values for 'not defined'.

| Message Format | Real-time vs Digest | Fields |
|---|---|---|
| Engine Instantaneous (Payload 10) | Real-time Tx | RPM, Oil Pressure, Oil Temp, Engine Temp, Alternator Output, Fuel Rate, Engine Hours, (Coolant Pressure), (Fuel Pressure) |
| Engine Warnings (Payload 11) | Real-time Tx | Engine Discrete Status 1[1], Engine Discrete Status 2[1], Engine ECU Status |
| Engine Digest (Payload 15) | Digest Tx (44 samples) | Engine Discrete Status 1[1], Engine Discrete Status 2[1], RPM, Oil Pressure, Oil Temp, Engine Temp, Alternator Output, Fuel Rate, Engine Hours |
| Engine Fuel Digest (Payload 16) | Digest Tx (200 samples) | Fuel Consumption[2], Avg Fuel Rate |

Engine Discrete Status 1 and Engine Discrete Status 2 can contain 16 and 8 single-bit engine warning flags, respectively.

Fuel Consumption is a derived value that can be calculated based on the instantaneous value of Fuel Rate received via Engine Parameters, Dynamic (PGN 127489).

Data can be acquired from the NMEA 2000 network at a one second rate and the key parameter values are compared to the last transmitted value. RPM, which is transmitted on the NMEA 2000 network at a 10 per second rate, can be averaged, and the average of samples taken in the last second can be used as the value in the sample set. All other acquired values in Engine Warnings and Engine Digest can be saved/transmitted unaveraged.

The current Engine Class start-up default can be to send all data using digests. Exceeding volatility thresholds for the following key parameter values RPM, Engine Oil Pressure, Engine Oil Temperature, Engine Temperature results in a sample set that can be saved to the Engine Digest message buffer. Exceeding volatility thresholds for fuel rate can result in a sample set saved to the Engine Fuel Digest. The Engine Digest and Engine Fuel Digest can be transmitted each day at UTC midnight, and anytime that the digest is filled due to data volatility. Engine Digest and Engine Fuel Digest can be requested by the cloud server for immediate transmission without waiting for the UTC midnight transmission. Digest requests can occur on user request.

Data can be temporarily stored on an on-board memory location. The data channeling system described above can be used to determine and minimize the amount of data that is transferred. A routine can be created that not only captures data less frequently, but also does not capture data into memory unless there is a significant change in the data. The data channeling system logs and stores data values at different rates per channel. The higher the rate of change of data in the channel, the more data is captured for transfer. In normal operation, the rate of change of the data generally is low and data is transferred at a low rate. The system experiences a high rate of change for some of the operational systems generally only for a short period of time. So, the average amount of data transmitted can be maintained at the minimum level. Therefore, all of the data from a previous time state can be represented even though time and significant change in state are recorded. In combination with slowing the reporting to the cloud to only once a day, or on rare occasions when the memory buffer is filled, it is possible to represent all the data from a prior time period even though only time and significant change of state is being recorded.

The following is a description of possible data processing requirements for the marine electronic device 320. This example data processing requirements is just one example. Other methods for data processing requirements could be implemented within the scope of the present invention. Various types of data can be captured from the NMEA network for access by the user. For example, these data sets can be; engine data; engine fuel consumption; fuel tank levels; and wind data. The engine data can be sent to the cloud server in individual event records based on the elevation or clearing of engine discrete warning. The other three data sets are can be captured from the NMEA 2000 network, stored, and sent to the backend cloud servers in a digest format for access by the end user. The engine fuel consumption can be recorded at sufficient intervals such that the backend can recreate the incremental fuel consumption between any two points in time. The tank levels can be recorded periodically. The wind data recorded at a sufficient interval such that the backend can recreate a historical wind data timeline.

Additional details on the data event and data digest transmissions are outlined below. Note that digest size information is based on a vessel in use for at least some time during the day. On days where the vessel is unused, the daily digests will consist of only a single entry, and will be well below the anticipated size used to estimate monthly data use.

A data digest, is a collection of data regarding a particular MTC channel. MTC channels represent well known vessel systems and/or subsystems. Each digest can consist of a header and one or more entries. Each entry represents the channel state at the time of some event. Recording an entry into the digest may occur on the result of an external event, or may occur because of some internal schedule or threshold analysis being performed.

Each entry consists of a timestamp and one or more data fields. Digests cannot exceed the maximum transmission length (MAX_APP_MSG_BYTES), such as for example 800 bytes. The tables presented below include show some example digest contents. In addition to scheduling criteria used by the MTC to determine when a digest is sent to the backend, the backend can request the current digest contents at any time. Regardless of the reason for a digest transmission, once the digest is transmitted, a new empty digest is created, and the next event triggers the first entry in that new digest.

MTC channel definitions can support both digest transmissions and individual data transmissions. Generally, the initial default will be to create digests. Requests can be made for either digest data or individual data, and must specify both the channel and the associated payload type. Individual requests can be made at any time, regardless of what mode the channel is operating in. Digest requests require that the channel be previously operating in digest mode.

Engine warnings can be monitored for state changes in any of the warning status bits resulting in transmission of an engine warning event message. Discrete state changes can be filtered to ignore state changes that last less than a given interval (WARN_MIN). In addition, discrete state changes do not need to trigger transmissions unless they persist for longer than a given interval (WARN_PERSIST) since the last state change for that warning.

When a state change passes the filter and results in an event transmission, the transmission can consist of the two Discrete Engine Status warning fields in addition to selected data values from PGNs 127488 and 127489. The transmission can occur as soon as the warning state transition satisfies the filter criteria. Some example types of filter criteria that may be used are debouncing and hysteresis. As a result, a new warning condition can be transmitted in near real time, while the display of repeat conditions that follow closely on the back of an original warning may get delayed considerably. This behavior is primarily to prevent bouncing warnings and to ensure that the warning display persists until the condition is truly resolved. The time constants may require tweaking to attain the desired behavior.

Because there is a separate state change filter for each warning contained within fields 11 and 12, cascading warnings associated with different parameters will result in multiple event messages. A cascading warning would be, for example a low oil pressure warning followed by a high engine temperature warning. In that case, both the low oil pressure and the high engine temperature warnings would generate near real time events.

Example initial interval values are:
WARN_MIN=2 second
WARN_PERSIST=60 minutes
Example estimated Warning Event Size
Data transmission size=17 bytes
Total transmission size=98 bytes (including 81 bytes LMU App Msg header)
Max events per month before exceeding Monthly budget=102
Monthly data budget=10,000 bytes/engine instance
Example digest Size Information
Log entry size=17 bytes
Max events per day for a single digest=44
Daily digest size=754 bytes (plus 81 bytes LMU App Msg header)
Monthly data=25,050 bytes/engine instance.

Engine fuel digest entries can contain both current fuel consumption and current engine hours.

The MTC can internally computes fuel consumption for an engine channel from the Engine Fuel Rate (PGN 127489) integrated over time. Fuel consumption represents total fuel consumed since the MTC channel was created, and can roll over at a certain volume (e.g., every 6.5532 cu-m (approximately 1730 gal.).

Engine hours are received from the associated engine (PGN 127489), and are truncated to two bytes. Accordingly, the engine hours entry rolls over at a predetermined interval (e.g., every 65,532 seconds (approximately 18 hours)). When required, the backend can request transmission of the Individual Engine Instantaneous message to receive the full four-byte Engine Hours.

The fuel consumption rate is monitored to determine how often entries are added to the engine fuel digest. The general objective is to minimize the error that may be incurred using a linear interpolation between any two entries to determine the consumption at any arbitrary time between those entries. In addition, the entry timing and digest transmission interval are adjusted to ensure that there is no more than one rollover between any two entries and no more than two rollovers in any given digest. The daily digest is also transmitted at a scheduled time each day. If the daily digest reaches the maximum data transmission size prior to the scheduled transmission time, it is transmitted, and a new digest is created to receive any remaining fuel consumption entries before the scheduled transmission time. When the digest is sent according to the schedule, the current fuel consumption and engine hours appended to the digest just before transmission.

Environmental data also can be monitored by the system of the present invention through an environmental channel. The environmental channel can collect information such as air temperature, humidity and air pressure. The data collected may be related to the outside weather, or may be related to one of the vessel internal spaces, such as the cabin or engine room. Examples of primary parameter groups received could be as follows:
Humidity (PGN 130313)
Pressure (PGN 130314)
Temperature, Extended. Range (PUN 130316)

In addition, there are several deprecated parameter groups that the vessel terminal could receive. Each channel is capable of receiving one value for each of the three primary groups. Generally, this is presumed to be taken at the same location. For example, the humidity, pressure and temperature in the engine compartment. So, when discovering a new source, three flash records can be generated, one for each PGN from the same source and using the same instance. Each transmission can also have a secondary instance indicating type of value. The types for each PGN may not be uniform across all three PGNs. Table 2 below illustrates some possible defined types of PGN's.

TABLE 2

| Type Enumeration | Humidity PGN 130313 | Pressure (PGN 130314) | Temperature (PGN 130316 |
|---|---|---|---|
| 0 | Inside | Atmospheric | Sea |
| 1 | Outside | Water | Outside |

TABLE 2-continued

| Type Enumeration | Humidity PGN 130313 | Pressure (PGN 130314) | Temperature (PGN 130316 |
|---|---|---|---|
| 2 | | Steam | Inside |
| 3 | | Compressed Air | Engine Room |
| 4 | | Hydraulic | Main Cabin |
| 5 | | Filter | Live Well |

As described above, the marine electronic device can create new manufacture data channels on the marine electronic device 320, and the cloud network 101 can create new data channels, for each sensor compatible with the CAN bus 300. This can empower NMEA device manufacturers to produce compatible devices. In some embodiments, user application 107 can also create a unique application experience on the computing device for each sensor or type of sensor compatible with the CAN bus 300. Example features that can be customized may include, for example, RPM, temperature, pressure, fuel consumption, etc. all of which can be plotted over a selectable time range. Example application experience elements that can be generated or customized may include automatic GUI tile generation. For example, a GUI tile may appear via the user application 107 automatically after 15 minutes of connectivity with a particular sensor or type of sensors. In combination with slowing the reporting to the cloud to only once a day, or on rare occasions when the memory buffer is filled, it is possible to represent all the data from a prior time period even though only time and significant change of state is being recorded.

It should be understood that the invention is not limited by the specific embodiments described herein, which are offered by way of example and not by way of limitation. For example, although the invention has been described herein in the context of ships and boats, the principles described herein can be adapted to other types of vehicles such as automobiles, trucks, aircraft and trains. Also, although the invention has been described as being used with an NMEA 2000 CAN based data bus, the present invention can be used with any type of bus uses in any type of vehicle. Other variations and modifications of the above-described embodiments and its various aspects will be apparent to one skilled in the art and fall within the scope of the invention, as set forth in the following claims. For example, the present invention could be used for multiple vessels, without departing from the scope of the invention.

What is claimed is:

1. A machine-type communication device comprising:
a receiver that receives sensor data digests from a plurality of operational systems;
a cellular connection for transmitting the data digests from the marine electronic device to a computing device through a cloud network; and
a processor that dynamically creates new data channels based on the plurality of operational systems when an unknown operational system is identified or detected, and transmit the data digests when a data digest is filled due to data volatility.

2. The device of claim 1, wherein unknown operational systems are identified and a new channel is created to interact with the identified operational system.

3. The device of claim 1, wherein the processor creates new channels in the device and in the cloud network for the plurality of operational systems.

4. The device of claim 1, wherein the processor links sensor data to pre-existing channels.

5. The device of claim 1, wherein unknown operational systems are identified when an incoming PGN is not linked to an existing channel.

6. The device of claim 5, wherein the receiver receives the data digests through a bus connected to the device.

7. The device of claim 6, wherein the bus is a CAN bus.

8. The device of claim 1, wherein the plurality of operational systems is selected from a group comprising: engine, fluid tanks, depth finders, bilge sensors, bilge pumps, wind sensors, location tracking and positioning devices, gyroscopic stabilization systems, GPS sensors, security systems, environment sensors, power systems, geo-fence sensors, battery monitoring sensors, engine metrics sensors, security sensors, shore power sensors, temperature sensors, remote switching sensors, and fluid tank sensors.

9. A method of monitoring and transmitting sensor data from a plurality of operational systems comprising:
receiving sensor data digests from a plurality of operational systems;
transmitting the data digests from a marine electronic device to a computing device through a cloud network;
dynamically creating new data channels when an unknown operational system is identified or detected; and
transmitting the data digests when a data digest is filled due to data volatility.

10. The method of claim 9, wherein unknown operational systems are identified and a new channel is created to interact with the identified operational system.

11. The method of claim 9, wherein new channels are created in the device and in the cloud network for the plurality of operational systems.

12. The method of claim 9, wherein the sensor data is linked to pre-existing channels.

13. The method of claim 9, wherein unknown operational systems are identified when an incoming PGN is not linked to an existing channel.

14. The method of claim 12, wherein the data digests are received through a bus connected to the device.

15. The method of claim 14, wherein the bus is a CAN bus.

16. The method of claim 9, wherein the plurality of operational systems is selected from a group comprising: engine, fluid tanks, depth finders, bilge sensors, bilge pumps, wind sensors, location tracking and positioning devices, gyroscopic stabilization systems, GPS sensors, security systems, environment sensors, power systems, geofence sensors, battery monitoring sensors, engine metrics sensors, security sensors, shore power sensors, temperature sensors, remote switching sensors, and fluid tank sensors.

17. A non-transitory computer readable medium having instruction recorded thereon that, when executed by a processing device, cause the processing device to:
receive sensor data digests from a plurality of operational systems;
transmit the sensor data digests from the marine electronic device to a computing device through a cloud network;
dynamically create new data channels based on the plurality of operational systems when an unknown operational system is identified or detected; and
transmitting the data digests when a data digest is filled due to data volatility.

18. The non-transitory computer readable medium of claim 17, further causing the processing device to identify unknown operational systems and a create new channel to interact with the identified operational system.

19. The non-transitory computer readable medium of claim 17, further causing the processing device to create new channels in the device and in the cloud network for the plurality of operational systems.

20. The device of claim 17, further causing the processing device to link sensor data to pre-existing channels.

21. The non-transitory computer readable medium of claim 17, wherein unknown operational systems are identified when an incoming PGN is not linked to an existing channel.

22. The non-transitory computer readable medium of claim 21, wherein the processing device receives the data digests through a bus connected to the device.

23. The non-transitory computer readable medium of claim 22, wherein the bus is a CAN bus.

24. The non-transitory computer readable medium of claim 17, wherein the plurality of operational systems is selected from a group comprising: engine, fluid tanks, depth finders, bilge sensors, bilge pumps, wind sensors, location tracking and positioning devices, gyroscopic stabilization systems, GPS sensors, security systems, environment sensors, power systems, geo-fence sensors, battery monitoring sensors, engine metrics sensors, security sensors, shore power sensors, temperature sensors, remote switching sensors, and fluid tank sensors.

25. The non-transitory computer readable medium of claim 17, further causing the processing device to the determine whether a change in the data exceeds a predetermined threshold when performing the volatility assessment.

26. The non-transitory computer readable medium of claim 25, wherein the predetermined threshold is based on a percent difference, an absolute difference, or a combination of a percent difference, an absolute difference.

* * * * *